(12) United States Patent
Zhang et al.

(10) Patent No.: US 12,381,739 B2
(45) Date of Patent: Aug. 5, 2025

(54) IMAGE MANAGEMENT METHOD AND APPARATUS

(71) Applicant: Huawei Technologies Co., Ltd., Shenzhen (CN)

(72) Inventors: Yu Zhang, Xi'an (CN); Jianfeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 181 days.

(21) Appl. No.: 18/308,414

(22) Filed: Apr. 27, 2023

(65) Prior Publication Data

US 2023/0261882 A1  Aug. 17, 2023

Related U.S. Application Data

(63) Continuation of application No. PCT/CN2021/101818, filed on Jun. 23, 2021.

(30) Foreign Application Priority Data

Oct. 29, 2020  (CN) .......................... 202011183293.3

(51) Int. Cl.
| | |
|---|---|
| *G06F 15/16* | (2006.01) |
| *G06F 9/54* | (2006.01) |
| *H04L 9/32* | (2006.01) |
| *H04L 29/06* | (2006.01) |

(52) U.S. Cl.
CPC ................................. *H04L 9/3247* (2013.01)

(58) Field of Classification Search
CPC ... H04L 9/3247; H04L 9/0643; H04L 9/3226; G06F 8/63; G06F 9/45558; G06F 21/53; G06F 2009/45562; G06F 2009/45575; G06F 21/64; G06F 21/31
USPC ......................................................... 713/189
See application file for complete search history.

(56) References Cited

U.S. PATENT DOCUMENTS

| | | | |
|---|---|---|---|
| 8,161,012 B1* | 4/2012 | Gerraty | G06F 21/53 |
| | | | 718/1 |
| 10,902,114 B1* | 1/2021 | Trost | G06F 16/26 |
| 11,080,403 B1* | 8/2021 | Taylor | G06F 21/566 |
| 11,573,816 B1* | 2/2023 | Featonby | H04L 67/10 |
| 11,954,219 B1* | 4/2024 | Makmal | H04L 9/3247 |

(Continued)

FOREIGN PATENT DOCUMENTS

CN  111562970 A  *  8/2020  ......... G06F 9/45558

OTHER PUBLICATIONS

"Content trust in Docker|Docker Documentation", Oct. 24, 2020, 6 pages, XP093133818.

(Continued)

*Primary Examiner* — Hamza N Algibhah
(74) *Attorney, Agent, or Firm* — Conley Rose, P.C.

(57) ABSTRACT

An image management method includes: receiving information about a signer and information about a target image that are sent by a first terminal device, where the signer is an object designated to sign the target image; obtaining a signature file based on the information about the signer and the information about the target image; and if a first digest that is of the target image and is returned by a container platform matches a second digest obtained based on the signature file, indicating the container platform to allow use of the target image to start a container.

20 Claims, 12 Drawing Sheets

(56) References Cited

U.S. PATENT DOCUMENTS

| | | | | |
|---|---|---|---|---|
| 2014/0095886 | A1* | 4/2014 | Futral | G06F 21/57 |
| | | | | 713/187 |
| 2016/0381075 | A1* | 12/2016 | Goyal | G06F 21/64 |
| | | | | 713/176 |
| 2018/0129479 | A1* | 5/2018 | McPherson | G06F 8/63 |
| 2018/0137174 | A1* | 5/2018 | Cahana | G06F 9/455 |
| 2019/0356492 | A1* | 11/2019 | Picco | H04L 67/125 |
| 2020/0272440 | A1* | 8/2020 | Burgazzoli | G06F 16/51 |
| 2020/0272737 | A1* | 8/2020 | Ji | G06F 21/54 |
| 2020/0296089 | A1* | 9/2020 | Hsiung | H04L 63/061 |
| 2021/0133313 | A1* | 5/2021 | Sakib | G06F 21/53 |
| 2021/0312037 | A1* | 10/2021 | Revivo | G06F 21/577 |
| 2022/0114249 | A1* | 4/2022 | Grancharov | G06F 21/53 |
| 2022/0318415 | A1* | 10/2022 | Fu | H04L 67/1097 |
| 2023/0370474 | A1* | 11/2023 | Migault | H04L 9/3247 |
| 2024/0424818 | A1* | 12/2024 | Zhang | B41M 3/14 |

OTHER PUBLICATIONS

"Get started with Notary |Docker Documentation", Sep. 7, 2020, 4 pages, XP093133820.

Weitekamp Aaron: "Container Image Signing", Jul. 22, 2016, 6 pages, XP093133898.

Zou, D., et al., "Constructing trusted virtual execution environment in P2P grids," Future Generation Computer Systems, vol. 26, No. 5, May 1, 2010, 7 pages, XP055978070.

Anonymous Red:"OpenShift—Wikipedia",Oct. 28, 2020 (Oct. 28, 2020), pp. 1-5, XP093268143.

\* cited by examiner

IMAGE MANAGEMENT METHOD AND APPARATUS

CROSS-REFERENCE TO RELATED APPLICATIONS

This is a continuation of Int'l Patent App. No. PCT/CN2021/101818, filed on Jun. 23, 2021, which claims priority to Chinese Patent App. No. 202011183293.3, filed on Oct. 29, 2020, both of which are incorporated by reference.

FIELD

This disclosure relates to the fields of cloud computing and information security technologies, and in particular, to an image management method and apparatus.

BACKGROUND

A container technology is a process-level virtualization technology at an operating system layer. The technology divides, isolates, and controls resources such as CPUs, memory, and file systems to implement transparent and independent resource usage between processes. To use the container technology in a production environment, a container platform and an image need to work together.

The container platform is a system for running a container. Generally, the container platform may include one or more of a server, a cloud platform, a container engine, a container orchestration tool, and the like, and may implement functions such as container deployment, running, maintenance, and management.

An image is the basis of a container. The container engine can use the image to start the container. The image is a file system package formed by an encapsulated file system and metadata that describes the image. The image includes all elements including a system, an environment, a configuration, and application code required by an application. In other words, security of image content directly affects running security of the container, and further affects security of underlying computing, storage, and network infrastructure of the container.

Therefore, how to ensure integrity and security of an image is a hot issue that is being studied by persons skilled in the art.

SUMMARY

Disclosed are an image management method and apparatus, to control security and integrity of an image, ensure security of image content and security of a container platform, and improve user experience.

Disclosed in a first aspect of an embodiment is an image management method, including: receiving information about a signer and information about a target image that are sent by a first terminal device, where the signer is an object designated to sign the target image; obtaining a signature file based on the information about the signer and the information about the target image; and if a first digest that is of the target image and is returned by a container platform matches a second digest obtained based on the signature file, indicating the container platform to allow use of the target image to start a container.

In the foregoing embodiment, the first terminal device obtains the information about the signer and the information about the target image, and obtains the signature file of the target image based on the information about the signer and the information about the target image. Because a mapping relationship exists between a digest of the target image and content of the target image, if the content of the target image is tampered with, the digest of the target image also changes correspondingly. Therefore, when the container platform starts the container based on the target image, if it is verified that the first digest of the target image matches the second digest of the target image when the signature file is generated, it indicates that the content of the target image is not tampered with. Therefore, the container platform may be indicated to allow use of the target image to start the container. In this way, security and integrity of the target image can be controlled, and security of the content of the target image and security of the container platform are ensured.

In addition, the signer can sign the image with only the first terminal device, and the signer does not need to generate a key pair, store a key, generate a signature file, or the like on a local terminal. This improves security of the image, reduces operation complexity of the signer, and improves user experience.

The foregoing method embodiment may be performed before an image is developed, when an image is pushed, or when an image is used. Therefore, the foregoing method embodiment may be used to track an entire life cycle of the image, and may be coupled with a pipeline for image construction, to adapt to a current cloud native development technology.

In a possible implementation of the first aspect, before the receiving information about a signer and information about a target image that are sent by a first terminal device, the method further includes: receiving indication information of the target image and description information of the signer that are sent by a second terminal device. Further, the description information of the signer indicates the signer that signs the target image.

It can be learned that the second terminal device may indicate which signers are required to sign the target image. In a possible design, an administrator enters a control policy of an image with the second terminal device. The control policy includes the indication information of the target image and the description information of the signer. The control policy is for controlling the target image. It can be learned that the administrator only needs to enter the control policy to control the image. This improves user experience. Especially, when a plurality of images needs to be managed (for example, an enterprise or an organization manages developed images), decoupling between an image research and development team, an image management team, and an image signer may be implemented. This improves user experience.

In another possible implementation of the first aspect, the indication information of the target image includes an identity of the target image and/or identification information of a container group used to run the target image.

It can be learned that a control function of a single image can be implemented, and a plurality of images that need to run in a container group can be controlled, to implement image control functions of various granularities, and satisfy a requirement of a user for controlling a single image, a plurality of images, and an image that needs to run in a container group.

In another possible implementation of the first aspect, the information about the signer includes identity information of the signer, and the method further includes: determining, based on the identity information, that identity authentication of the at least one signer succeeds.

In the foregoing description, an identity of a signer may be authenticated in an image management process. In this way, an untrusted signer can be kept from signing a signature file. This improves security of an image.

In another possible implementation of the first aspect, the determining, based on the identity information, that authentication on identity information of the at least one signer succeeds includes: receiving authentication information of the signer sent by the second terminal device; and determining, based on the authentication information of the signer and the identity information, that identity authentication of the signer succeeds.

The foregoing provides a method for authenticating an identity of a signer. An administrator, an automated management program, or the like may set the authentication information of the signer with the second terminal device. When uploading the identity information of the signer, the first terminal device may compare the identity information with the authentication information. If the identity information is consistent with the authentication information, it indicates that an identity of the signer is trusted.

In another possible implementation of the first aspect, information transmission between the second terminal device, the first terminal device, and the container platform is supported through an application programming interface (API).

The foregoing describes a communication manner. The second terminal device, the first terminal device, and the container platform are connected by an API interface. The foregoing device can implement functions such as image management, image signature, and image startup control by invoking a related function only through the API interface. This reduces difficulty of user operations.

In another possible implementation of the first aspect, after the receiving description information of at least one signer sent by a second terminal device, the method further includes: generating a key pair corresponding to the signer, where the key pair includes a public key and a private key.

In the foregoing description, a key pair may be generated in an image management process, and the key pair may be used in a signature, identity authentication, and a startup control process. Further, the key pair may be stored in the image management apparatus, and the user does not need to locally store a public key and a private key, so that key leakage can be avoided.

In another possible implementation of the first aspect, the information about the target image includes a hash value of the target image, the information about the signer corresponds to the private key of the signer, and the obtaining a signature file based on the information about the signer and the information about the target image includes: generating the signature file based on the private key of the signer and the hash value of the target image.

The foregoing describes a manner of generating a signature file. Information about an image includes a hash value of an image, and a signature file may be generated based on the private key of the signer and the hash value of the image. Because a mapping relationship exists between content of an image and a hash value of the image, if the content of the image is tampered with, a digest of the image also changes accordingly, so that whether the content of the image is tampered with can be identified based on the hash value of the image.

In another possible implementation of the first aspect, the method further includes: receiving a request message sent by the container platform, where the request information requests to use the target image to start the container on the container platform. Further, the request message includes the first digest.

Specifically, the container platform may add the indication information of the target image to the request message, and invoke startup control of the image through the API interface. In this way, when the container platform starts the container, the digest information of the target image is provided, and whether the image is secure may be determined based on fed-back indication information. An image check function of the container platform does not need to be adjusted, so that container platforms provided by a plurality of service providers can be quickly compatible.

In another possible implementation of the first aspect, the method further includes: adding the authentication information of the signer to a signer database based on the authentication information of the signer.

In another possible implementation of the first aspect, the signer includes a first signer and a second signer; and the first terminal device includes a first subdevice and a second subdevice, where the first subdevice is a device used by the first signer, and the second subdevice is a device used by the second signer.

According to embodiments, a plurality of signers may separately upload, with one or more devices, information used for signature, to separately obtain signature files, so that a multi-person signature mechanism is implemented.

According to a second aspect, an embodiment provides an image management apparatus, including: a receiving unit configured to receive information about a signer and information about a target image that are sent by a first terminal device, where the signer is an object designated to sign the target image; and a processing unit configured to obtain a signature file based on the information about the signer and the information about the target image, the processing unit being configured to: if a first digest that is of the target image and is returned by a container platform matches a second digest obtained based on the signature file, indicate the container platform to allow use of the target image to start a container.

In another possible implementation of the second aspect, the receiving unit is further configured to: receive indication information of the target image and description information of the signer that are sent by a second terminal device, where the description information of the signer indicates the signer that signs the target image.

In another possible implementation of the second aspect, the indication information of the target image includes an identity of the target image and/or identification information of a container group used to run the target image.

In another possible implementation of the second aspect, the information about the signer includes identity information of the signer, and the processing unit is further configured to: determine, based on the identity information, that identity authentication of the at least one signer succeeds.

In another possible implementation of the second aspect, the receiving unit is further configured to receive authentication information of the signer sent by the second terminal device; and the processing unit is further configured to determine, based on the authentication information of the signer and the identity information, that identity authentication of the signer succeeds.

In another possible implementation of the second aspect, the apparatus supports information transmission between the second terminal device, the first terminal device, and the container platform through an API.

In another possible implementation of the second aspect, the processing unit is further configured to generate a key pair corresponding to the signer, where the key pair includes a public key and a private key.

In another possible implementation of the second aspect, the information about the target image includes a hash value of the target image; the information about the signer corresponds to the private key of the signer; and the processing unit is further configured to generate the signature file based on the private key of the signer and the hash value of the target image.

In another possible implementation of the second aspect, the receiving unit is further configured to receive a request message sent by the container platform, where the request information requests to use the target image to start the container on the container platform. Further, the request message includes the first digest.

In another possible implementation of the second aspect, the processing unit is further configured to add the authentication information of the signer to a signer database based on the authentication information of the signer.

In another possible implementation of the second aspect, the signer includes a first signer and a second signer; and the first terminal device includes a first subdevice and a second subdevice, where the first subdevice is a device used by the first signer, and the second subdevice is a device used by the second signer.

According to a third aspect, an embodiment provides an image management apparatus, including a processor and a memory. The processor is configured to execute computer instructions stored in the memory, so that the image management apparatus implements the method described in any one of the first aspect or the possible implementations of the first aspect.

In a possible implementation of the third aspect, the image management apparatus further includes a communications interface, and the processor is further configured to: receive, through the communications interface, information about a signer and information about a target image that are sent by a first terminal device, where the signer is an object designated to sign the target image; obtain a signature file based on the information about the signer and the information about the target image; and if a first digest that is of the target image and is returned by a container platform matches a second digest obtained based on the signature file, indicate the container platform to allow use of the target image to start a container.

In another possible implementation of the third aspect, the processor is further configured to: receive, through the communications interface, indication information of the target image and description information of the signer that are sent by a second terminal device, where the description information of the signer indicates the signer that signs the target image.

In another possible implementation of the third aspect, the indication information of the target image includes an identity of the target image and/or identification information of a container group used to run the target image.

In another possible implementation of the third aspect, the information about the signer includes identity information of the signer, and the processor is further configured to: determine, based on the identity information, that identity authentication of the at least one signer succeeds.

In another possible implementation of the third aspect, the processor is further configured to: receive, through the communications interface, authentication information of the signer sent by the second terminal device; and determine, based on the authentication information of the signer and the identity information, that identity authentication of the signer succeeds.

In another possible implementation of the third aspect, the apparatus supports information transmission between the second terminal device, the first terminal device, and the container platform through an API.

In another possible implementation of the third aspect, the processor is further configured to generate a key pair corresponding to the signer, where the key pair includes a public key and a private key.

In another possible implementation of the third aspect, the information about the target image includes a hash value of the target image; the information about the signer corresponds to the private key of the signer; and the processor is further configured to generate the signature file based on the private key of the signer and the hash value of the target image.

In another possible implementation of the third aspect, the processor is further configured to receive, through the communications interface 1204, a request message sent by the container platform, where the request information requests to use the target image to start the container on the container platform. Further, the request message includes the first digest.

In another possible implementation of the third aspect, the processor is further configured to add the authentication information of the signer to a signer database based on the authentication information of the signer.

In another possible implementation of the third aspect, the signer includes a first signer and a second signer; and the first terminal device includes a first subdevice and a second subdevice, where the first subdevice is a device used by the first signer, and the second subdevice is a device used by the second signer.

According to a fourth aspect, disclosed in an embodiment is a server. The server includes a processor and a memory. The processor is configured to execute computer instructions stored in the memory, so that the server implements the method described in any one of the first aspect or the possible implementations of the first aspect.

According to a fifth aspect, disclosed in an embodiment is an image management system, including an image management apparatus, a first terminal device, and a second terminal device. The image management apparatus includes the apparatus described in any one of the second aspect or the possible implementations of the second aspect, or includes the apparatus described in any one of the third aspect or the possible implementations of the third aspect.

According to a sixth aspect, disclosed in an embodiment is an image management system, including an image management apparatus, a first terminal device, a second terminal device, and a container platform. The image management apparatus includes the apparatus described in any one of the second aspect or the possible implementations of the second aspect, or includes the apparatus described in any one of the third aspect or the possible implementations of the third aspect.

According to a seventh aspect, disclosed in an embodiment is a computer-readable storage medium. The computer-readable storage medium stores computer instructions. The computer instructions are used to implement the method according to any one of the first aspect or the possible implementations of the first aspect.

According to an eighth aspect, disclosed in an embodiment is a computer program product. The computer program product is configured to implement the method described in any one of the first aspect or the possible implementations of the first aspect.

It may be understood that for beneficial effects of the technical solutions provided in the second aspect and the third aspect, refer to the beneficial effects of the first aspect. Therefore, details are not described again.

BRIEF DESCRIPTION OF THE DRAWINGS

The following describes the accompanying drawings used in embodiments.

DETAILED DESCRIPTION

Figure 1:
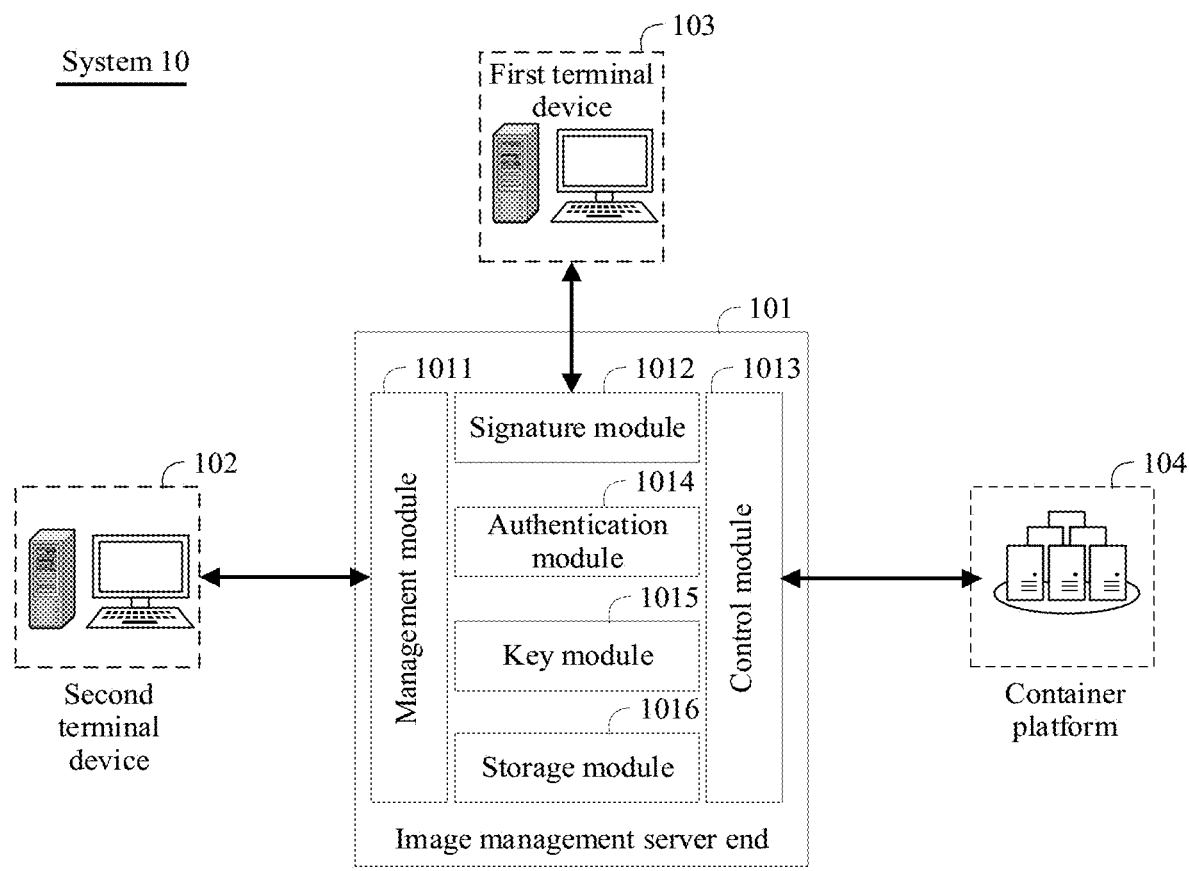
FIG. 1 is a schematic diagram of an architecture of an image management system according to an embodiment.

The following describes embodiments with reference to the accompanying drawings. It should be noted that the term "example" or "for example" means used as an example, an illustration, or a description. Any embodiment or design scheme described as "example" or "for example" should not be explained as being more preferred or having more advantages than another embodiment or design scheme. Use of the term such as "example" or "for example" is intended to present a related concept in a specific manner.

The following first explains technical terms.

1. Container

A container is a series of processes that are isolated from other parts of a system. A container technology is a virtualization technology in a computer operating system. This technology enables a process to run in an independent and isolated environment (including an independent file system, a namespace, a resource view, and the like), so that a deployment procedure of software can be simplified, portability and security of software can be enhanced, and resource utilization of the system can be improved. The container technology is widely used in service-oriented scenarios in the field of cloud computing. The use of the container technology requires cooperation between objects and components such as a container image, a container engine, and an orchestration platform.

2. Image

The image is a file system package formed by an encapsulated file system and metadata that describes the image. The image includes elements including one or more of a system, an environment, a configuration, and application code required by an application. For example, a testing version operating system is packaged to obtain a testing system image, and a game program is packaged to obtain a game image.

An image is the basis of a container. The container engine can use the image to start the container. An image includes elements required by an application. Therefore, security of image content directly affects security of running of the container, and further affects security of underlying computing, storage, and network infrastructure of the container.

3. Kubernetes

Kubernetes (also called K8s) is an open-source container orchestration tool and a de facto standard for a container orchestration tool. Kubernetes is used to manage container orchestration, deployment, and management on a plurality of hosts on a cloud platform, and can adapt to a plurality of container engines to provide convenient, efficient, and elastic application container management.

Kubernetes provides powerful container orchestration capabilities, and provides a control point for a user before a container engine uses an image to start a container, to restrict, according to rules, startup of the container corresponding to the image. This mechanism is called Kubernetes admission control. Admission Control includes a rule chain formed by default rules in a system and user-defined rules. An image needs to satisfy all rules in the rule chain before a container corresponding to the image is allowed to be started by the container engine.

4. Container Platform

The container platform is a system configured to run a container, and includes a server, a cloud platform, a container engine, a container orchestration tool, and the like, and may implement functions such as container deployment, running, maintenance, and management.

5. Image Repository

An image repository is used to store container images in a centralized manner, and may be classified into a public image repository and a private image repository. The public image repository can be accessed via the Internet, and the private image repository can be accessed only via a local network in which the private image repository is located.

6. Hash Value

A hash value is an output value obtained based on a segment of data (for example, a character string, a number, or a file) according to a hash algorithm. A hash value of an image is a fixed-length hash value obtained by performing hash algorithm calculation on image content. The hash value may also be referred to as a digital digest of the image, and may be used for signature calculation. Generally, when an image file is obtained by packaging according to a standard format, the hash value of the image may be obtained as one of attributes of the image file.

7. Signature Mechanism

The signature mechanism is used to protect integrity and authenticity of data. Generally, this mechanism is implemented based on a key pair including a public key and a private key. Specifically, an operation may be performed on a digital digest of protected data by using an asymmetric key algorithm and the private key to generate a digital signature.

The digital digest can be obtained by performing a reverse operation on the digital signature by using the public key and the asymmetric key algorithm. It is determined, by comparing the digital digest obtained through the reverse operation with the digital digest obtained through calculation of the protected data, whether the protected data is tampered with.

Figure 2A:
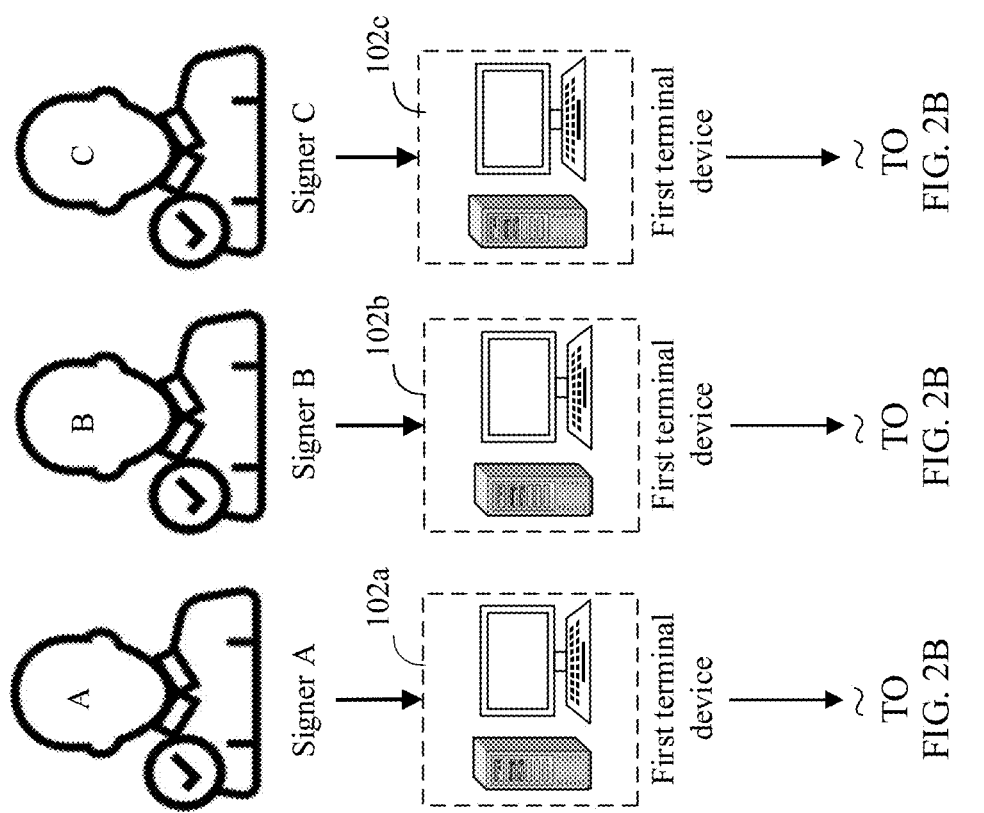
FIG. 2A and FIG. 2B are a schematic diagram of a use scenario of an image management system according to an embodiment.
Figure 2B:
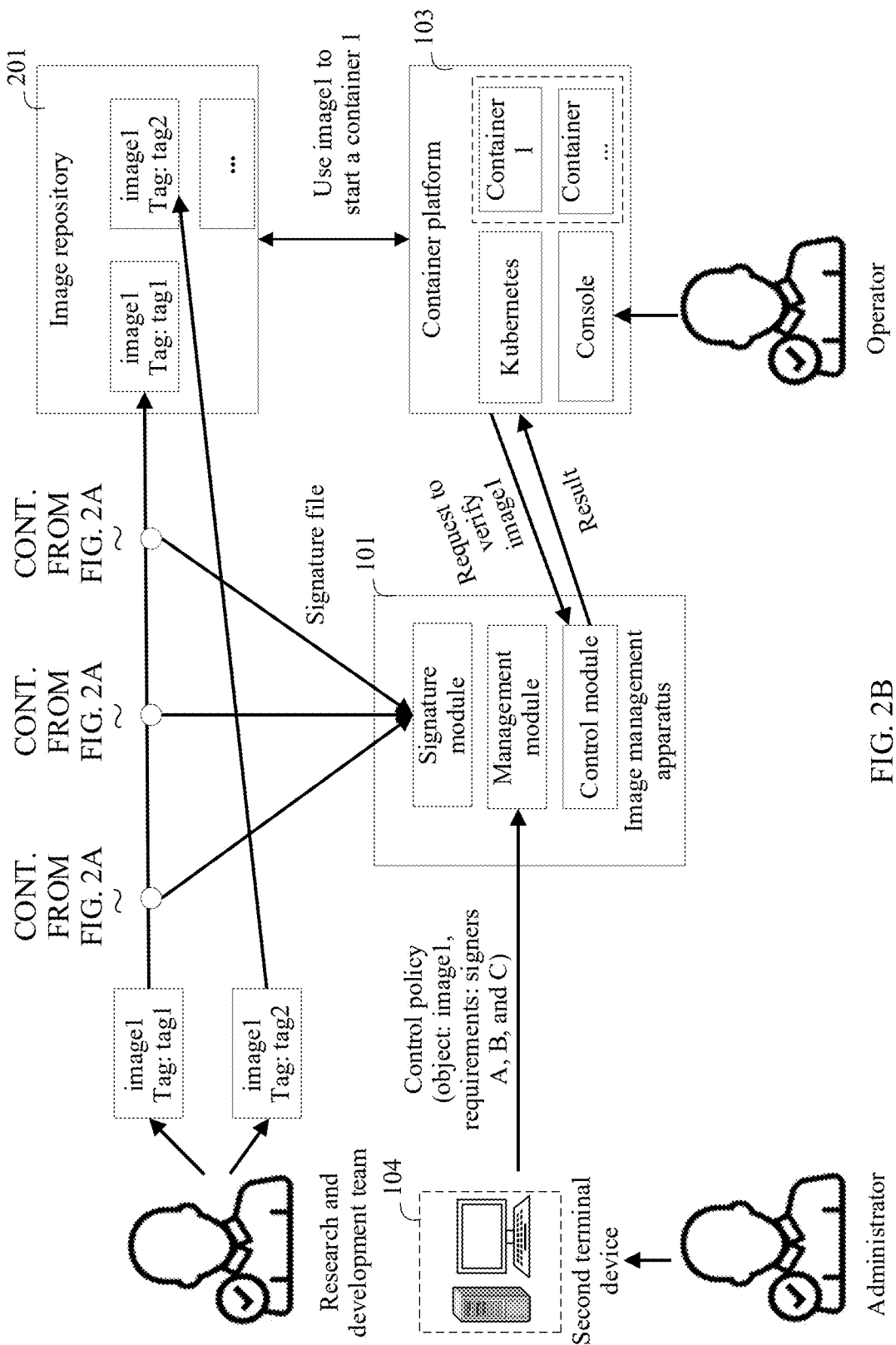

FIG. 1 is a schematic diagram of a structure of a possible image management system 10 according to an embodiment. FIG. 2A and FIG. 2B are a schematic diagram of a use scenario of the system 10. The system 10 includes an image management apparatus 101 and a first terminal device 102. Optionally, a container platform 103 may be further included. Further optionally, a second terminal device 104 may be further included.

The first terminal device 102 is a device or a device group that has a data processing capability and a data storage capability, and is used by a signer of an image to submit information used to generate a signature file. For example, attribute information (for example, an identification, a number, and a hash value) of a target image and identity information (for example, an account, a name, and an identity) of the signer are submitted. The first terminal device may be one device, or may be a device group formed by a plurality of devices. For example, with reference to FIG. 2A and FIG. 2B, a first terminal device 102a, a first terminal device 102b, and a first terminal device 102c form a group of first terminal devices. The first terminal device 102a is a device used by a signer A, and may submit identity information of the signer A. The first terminal device 102b is a device used by a signer B, and may submit identity information of the signer B. Other devices are deduced by analogy.

The container platform 103 is a platform for running a container, and may start a container in the container platform based on a target image. The container platform 103 may send information about a to-be-run target image to the image management apparatus 101, receive a security verification result fed back by the image management apparatus 101, and determine, in response to the verification result, whether to start a container based on the target image. Generally, Kubernetes may be deployed in the container platform, and Kubernetes may manage a plurality of containers in the container platform. Certainly, in some possible scenarios, another application may be deployed to manage containers.

The second terminal device 104 is a device or a device group that has a data processing capability and a data storage capability, and is configured to submit indication information of a target image and designate a signer of the target image.

The image management apparatus 101 is a device or a device group that has a data processing capability and a data storage capability, and may interact with the first terminal device 102, the container platform 103, and the second terminal device 104 to implement security management on an image.

In a possible design, the image management apparatus 101 may further specifically include a management module 1011, a signature module 1012, and a control module 1013. Further, one or more of an authentication module 1014, a key module 1015, and a storage module 1016 may be further included. Optionally, any one of the management module 1011, the signature module 1012, the control module 1013, the authentication module 1014, and the key module 1015 is an electronic device having a data processing capability or a component (for example, a chip or an integrated circuit) in an electronic device having a data processing capability. The electronic device may be a physical device, for example, may be one or more of a host, a rack server, or a blade server; or may be a virtual device, for example, may be one or more of a virtual machine or a container.

The storage module 1016 is a device having a data storage capability, and may be a physical storage device, for example, a memory (including a random-access memory (RAM), a read-only memory (ROM), an erasable programmable ROM (EPROM), and the like), a disk (including a portable ROM (compact disc ROM (CD-ROM)), a hard disk, and the like), or another electronic device having a data storage capability, for example, a network-attached storage (NAS) server, or a virtual storage device, for example, a virtual machine and a container.

It should be noted that a plurality of modules of the image management apparatus 101 may be deployed in different devices, or may be deployed in a same device, or may be deployed in a same server group. For example, the distributed server may be a server group including a plurality of servers. The group may include a cloud computing server, a content delivery network (CDN) server, a Network Time Protocol (NTP), a Domain Name System (DNS) server, a storage server, and the like. The group may further include a NAS configured to store data. Devices of the distributed server may coordinate with each other to complete functions such as computing, data storage, and communication. In a possible design, the management module 1011, the signature module 1012, and the control module 1013 may be deployed on a CDN server in a distributed server, the authentication module 1014 and the key module 1015 may be deployed on a cloud computing server in the distributed server, and the storage module 1016 may be deployed on a memory server in the distributed server.

Specifically, the management module 1011 may be configured to perform one or more of determining a control policy of an image, setting description information of a signer, determining authentication information of the signer, and the like. Optionally, the management module in embodiments may also be referred to as an interaction module.

The control policy of the image may include one or more of indication information, a control requirement, and the like of a control object (for example, the target image). Optionally, the indication information of the control object may be an identification of the image (for example, one or more of a name, a number, and an identification (ID) of the image) and/or an identification of a group that uses the image. In other words, the indication information of the control object may include one of the identification of the image and the identification of the group, or may include both the identification of the image and the identification of the group.

Figure 3:
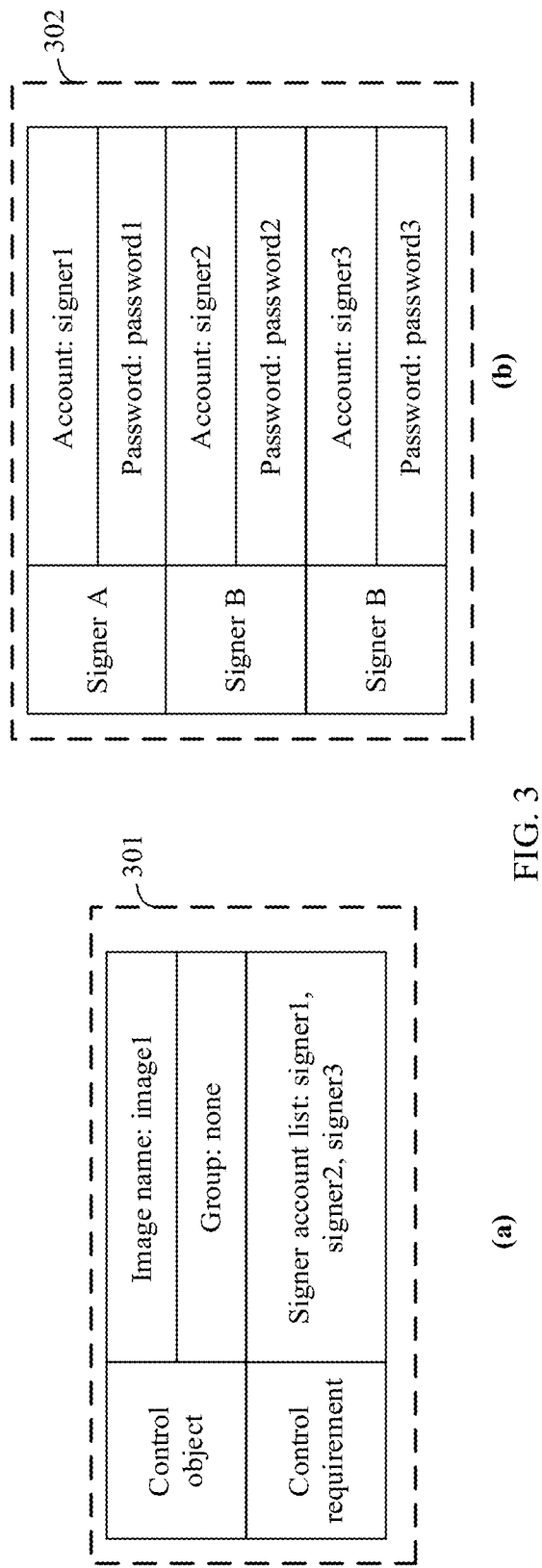
FIG. 3 is a schematic diagram of a possible control policy of an image and possible description information of a signer according to an embodiment.

It may be understood that when the indication information of the control object includes the identification of the image, the control policy is applicable to the image corresponding to the identifier. When the indication information of the control object includes the identification of the group, the control policy is applicable to an image running in the group indicated by the identification. When the indication information of the control object includes both the identification of the image and the identification of the group, the control policy is applicable to a designated image running in the group indicated by the identification. FIG. 3 is a schematic diagram of a possible control policy of an image and possible description information of a signer according to an embodiment. With reference to part (a) in FIG. 3, in a control policy shown in an area 201, a control object includes indication information (that is, image1) of an image and indication information of a group (indication information of a group with a control policy being empty shown in FIG. 3, which may be a name, a number, or the like of the group in a specific implementation process), indicating that the control policy is applicable to an image named image1.

Optionally, one identifier of an image may correspond to one or more images. Further, optionally, the indication information of the control object may further include a tag of the image. If the indication information of the control object includes an identification of the image and the tag of the image, the control policy is applicable to an image that has the tag.

Optionally, the control policy of the image, the description information of the signer, and the like may be preconfigured, or may be obtained by a management module based on information sent by a second terminal device. For example, with reference to FIG. 2A and FIG. 2B, an administrator may enter a control policy with the second terminal device 104, and the second terminal device 104 may send the control policy to the image management apparatus 101. The control policy may include indication information of a control object (with reference to an example in FIG. 2A and FIG. 2B, the indication information is image1). It may be understood that two images (with tags being tag1 and tag2) are obtained by a research and development team, and identifiers of the two images are both image1. Because the control policy does not include a tag of an image, the control policy is applicable to the two images with identifiers being image1.

A control requirement in the control policy of the image includes description information of a signer (for example, one or more of a name, a number, an ID, and the like of the signer), and the description information of the signer is for describing an object that signs a target image. The description information of the signer may be specifically an account list of signers. For example, with reference to FIG. 3, an example in which the image image1 needs signature files of signers A, B, and C is used, and the account list of signers includes accounts of the signers A, B, and C. It should be noted that, the signers A, B, and C are included for ease of description. In a specific implementation, any quantity of signers may be included, and the description information may be serial numbers, IDs, or the like of the signers.

The authentication information of the signer includes one or more of an account, a name, a password, or the like of the signer. Optionally, the administrator may enter the authentication information of the signer with the second terminal device 104, and the second terminal device 104 may send the authentication information of the signer to the management module 1011 (for example, when the administrator adds a new signer, or when the administrator edits information about the signer). For example, the image image1 requires the signature files of the signers A, B, and C. With reference to part (b) in FIG. 3, the authentication information of the signer in the area 302 includes an account (that is, signer1, which is only used as an example) and a password (that is, password1, which is only used as an example) of the signer A, an account and a password of the signer B, and an account and a password of the signer C.

Optionally, the management module may externally provide an API, and the management module may receive, through an API, the control policy and/or the authentication information sent by the first terminal device 102.

The signature module 1012 is configured to sign the target image. For example, with reference to FIG. 2A and FIG. 2B, the signer A may send a hash value of the target image with the first terminal device 102a. Correspondingly, the signature module receives the hash value of the target image sent by the first terminal device 102a. The signature module may generate a signature file of the target image based on a private key corresponding to the signer A and the hash value of the target image. Signature processes of other signers may be deduced by analogy, and details are not described herein again.

Further, the signature module 1012 may further perform a function of verifying authenticity of the signature file. For example, a signature file F1 is generated based on the private key corresponding to the signer A and the hash value of the target image. When verifying the signature file, the signature module 1012 may verify security and integrity of the signature file F1 based on a public key of the signer and the hash value of the target image.

The control module 1013 is configured to: receive a request for verifying security of a target image, feed back a verification result to a container platform, and the like. For example, with reference to FIG. 2A and FIG. 2B, the container platform 103 may pull the target image from an image repository 201, and apply to the image management apparatus 101 for using the target image to start a container. Optionally, an operator may indicate, by using a console, the container platform 103 to pull an image and start a container. The container platform 103 may send information about the target image to the control module 1013, so that the control module 1013 may verify the signature file and the like of the target image. For example, the control module checks whether the signature file of the target image includes signature files of all designated signers and whether the signature files are correct. If the verification of the signature file succeeds, the control module 1013 may send verification success indication information to the container platform 103, so that the container platform 103 starts a container. It may be understood that, if the verification fails, the control module 1013 may feed back verification failure indication information to the container platform 103, and the container platform may reject, based on the verification failure indication information, start of a target container.

The authentication module 1014 is configured to: provide an identity authentication function, feed back an identity authentication result, and manage related authentication information.

The key module 1015 is configured to provide a key management function, generate a key pair based on the information about the signer and perform effective management, and provide a key when another module requires a key.

The storage module 1016 is configured to: provide a storage function, for example, store the information about the signer, a key pair of the signer, a signature file of the image, and a control policy of the image, and feed back related information to each module when the related information is requested.

In addition, the signer may be a user, or may be an object such as a computer program that can operate or invoke an input module in a computer. For example, the signer may be an artificial intelligence (AI) program that checks code.

Figure 4:
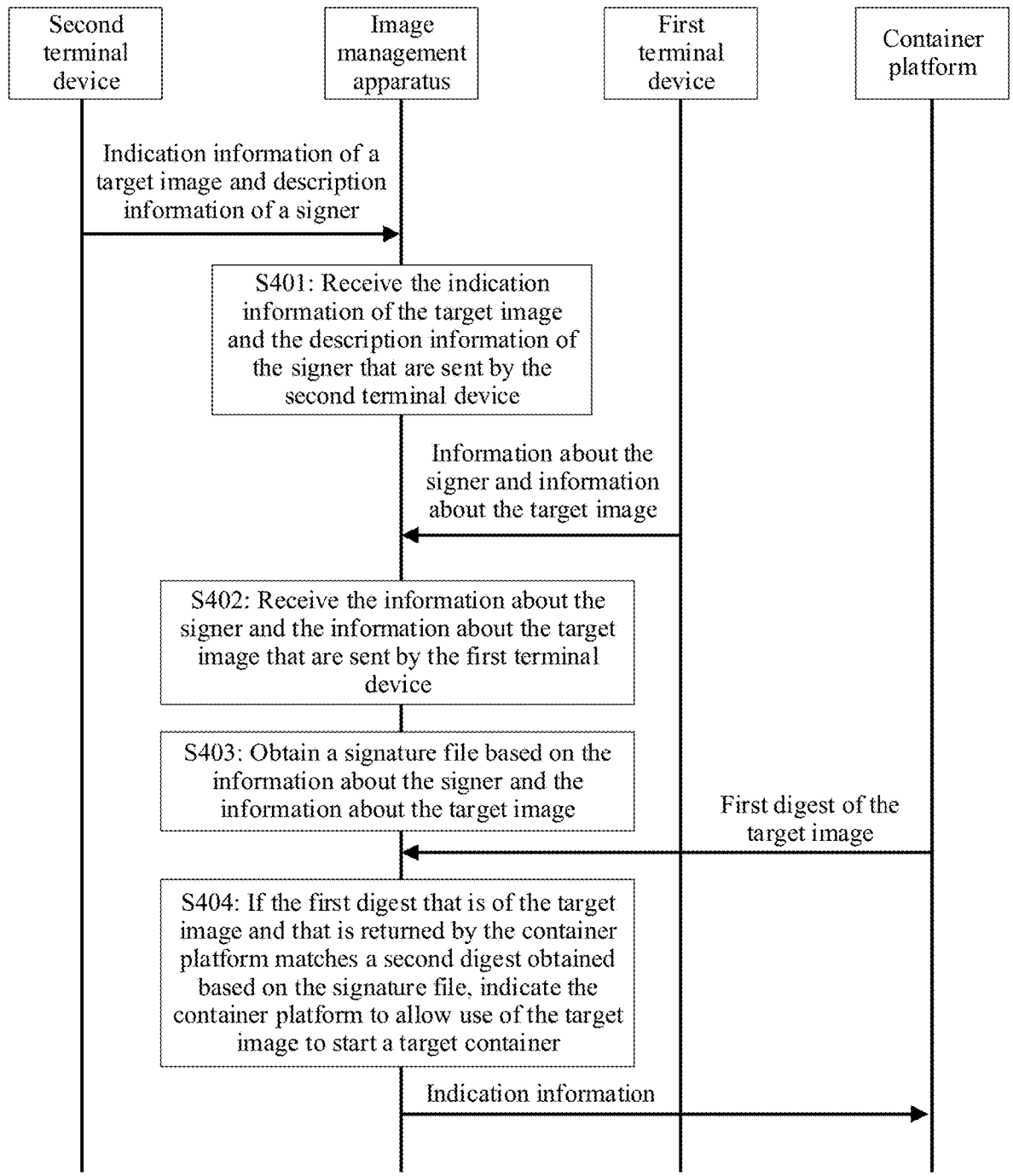
FIG. 4 is a schematic flowchart of an image management method according to an embodiment.

FIG. 4 is a schematic flowchart of an image management method according to an embodiment. Further, the method may be implemented based on the framework shown in FIG. 1, and the method includes at least the following steps.

Optionally, the image management method shown in FIG. 4 includes step S401. Step S401 is specifically as follows:

Step S401: An image management apparatus receives indication information of a target image and description information of a signer that are sent by a second terminal device. The signer is an object designated to sign the target image. Optionally, it may be understood that in an actual implementation scenario, the indication information of the target image and the description information of the signer may be sent by the second terminal device to the image management apparatus, or may not be sent by the second terminal device to the image management apparatus (for example, predefined or preconfigured by the image management apparatus, or obtained by the image management apparatus through querying from a network side device), and may specifically depend on implementation of the image management apparatus and a pre-agreement.

Specifically, the target image is a file system package developed by a research and development team. Generally, the research and development team obtains service software through development, and packages the service software according to an image packaging standard to obtain the target image. After image development, the target image may be pushed to an image repository for storage.

To distinguish different images, indication information of an image may be used to indicate the image. The indication information of the target image includes an identification (for example, one or more of a name, a number, and an ID of the image) of the target image, and may further include identification information of a group used to run the target image. Optionally, when the indication information of the target image includes the identification of the image, the image management apparatus manages the image (that is, the target image) corresponding to the identification. When the indication information of the target image includes an identification of the group, the image management apparatus manages an image that runs in the group indicated by the identification. When the indication information of the target image includes both the identification of the image and the identification of the group, the image management apparatus manages a designated image that runs in the group indicated by the identification.

For example, the target image is image1. The indication information of the target image may be a name (that is, image1) of the target image, or may be an ID of the image image1 (for example, if an ID of image1 is 0010, the second terminal device may add "0010" to a message to indicate the target image), to indicate that a managed object is the image image1.

In another example, a container platform includes one or more container groups (for example, may include a container group 1, a container group 2, and a container group 3), and the indication information of the target image may be an identification of the container group 1, and indicates that a managed object is an image running in the container group 1. Certainly, only the group 1 is used as an example. In a specific implementation, one or more container groups may be used.

Further, optionally, the indication information of the target image may further include a tag of an image, and the tag is used to designate an image with a tag. Generally, because the same service software may have a plurality of different versions, images of different versions (for example, a development version, an alpha version, and a release version) may be distinguished by attaching tags to the images.

The description information of the signer indicates a signer that signs the target image, and may include one or more of a name, a number, an ID, and the like of one or more signers. The description information of the signer may be specifically an account list of signers. For example, with reference to FIG. 3, an example in which the image image1 needs signature files of signers A, B, and C is used, and the account list of signers includes accounts corresponding to the signers A, B, and C. It should be noted that, the signers A, B, and C are included for ease of description. In a specific implementation, any quantity of signers may be included.

It should be noted that the indication information of the target image and the description information of the signer may be sent in a same message, or may be sent in different messages. For ease of understanding, the indication information of the target image and the description information of the signer are described as being sent with one action. This is not intended to limit the present disclosure. In some specific implementation scenarios, the indication information of the target image and the description information of the signer may be encapsulated together as a control policy. The second terminal device includes the control policy in a first message and sends the first message to the image management apparatus. The image management apparatus parses the first message to obtain the indication information of the target image and the description information of the signer.

Optionally, the second terminal device sends the indication information of the target image and the description information of the signer to the image management apparatus. Correspondingly, the image management apparatus receives the indication information of the target image and the description information of the signer from the second terminal device. For example, an administrator uses the second terminal device to enter the indication information of the target image and the description information of the signer into the second terminal device, and the second terminal device sends the indication information of the target image and the description information of the signer to the image management apparatus. Further optionally, the second terminal device may send information to the image management apparatus after receiving a confirmation operation of the administrator.

Figure 5:
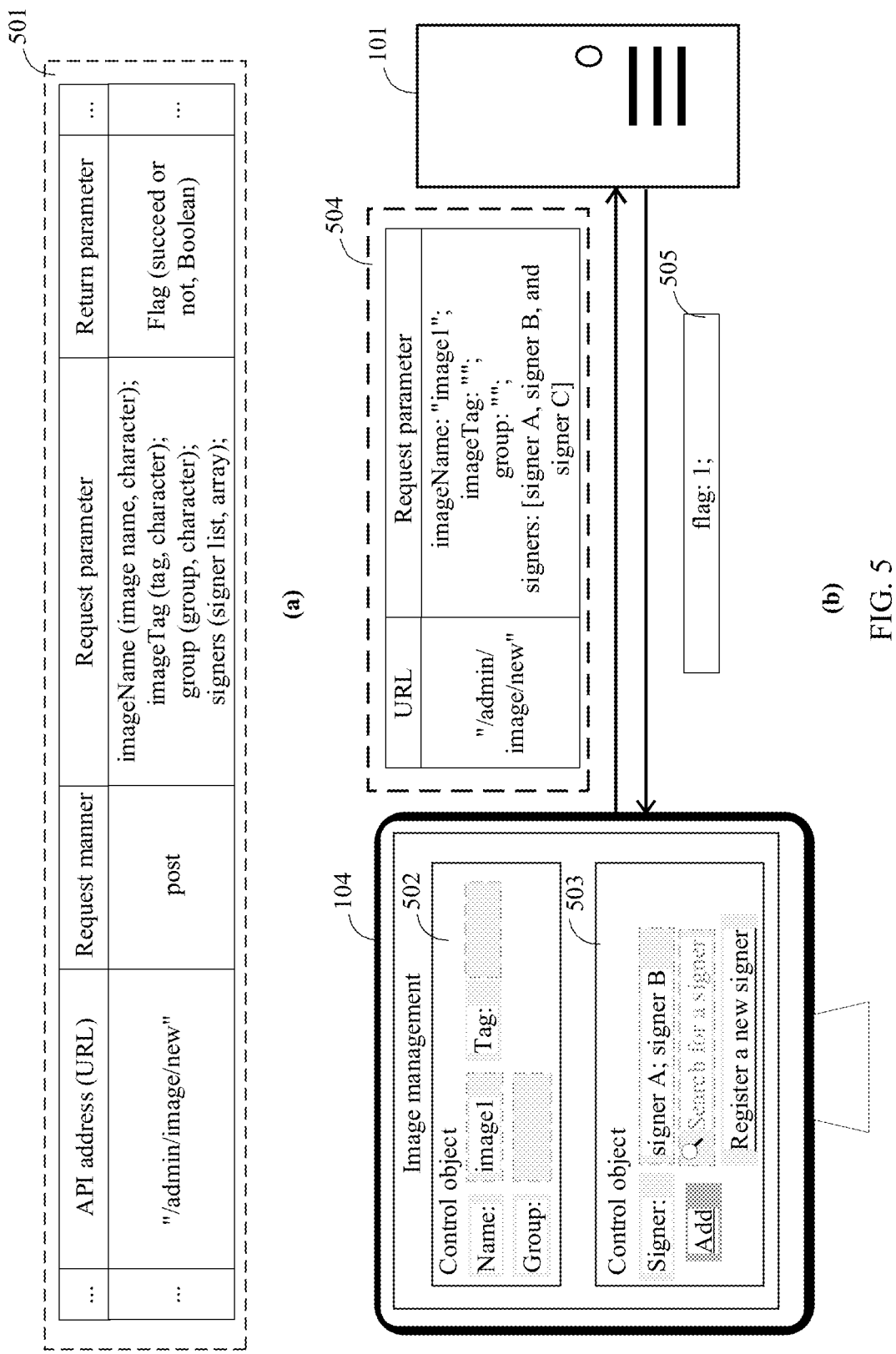
FIG. 5 is a schematic diagram of a scenario in which a second terminal device communicates with an image management apparatus according to an embodiment.

In a possible design, the image management apparatus may provide an API (referred to as a first API for ease of description), and the second terminal device may send the indication information of the target image and the description information of the signer to the image management apparatus through the first API. For example, FIG. 5 is a schematic diagram of a possible scenario in which a second terminal device communicates with an image management apparatus according to an embodiment. A part (a) in FIG. 5 is a schematic diagram of possible attributes of an API 501. The attributes of the API 501 include an API address, a request method, a request parameter, and a return parameter. The API address may be represented as a uniform resource locator (URL). The request method may include at least the following four methods: a get method, a put method, a post method, and a delete method. The request parameter is a parameter entered when an interface is requested. The return parameter is a parameter returned after the interface is processed. Generally, the request parameter and the return parameter may be defined to include a field (which may also be referred to as a parameter name, for example, imageName), a description (for describing the field), a type (a type of a parameter, which may be an integer, a Boolean type, a character type, a floating point type, or an array type), remarks, whether the field is mandatory or not, and the like. It can be learned that the API 501 defines an interface used when the second terminal sends information to the image management apparatus. With reference to a part (b) in FIG. 5, in a possible design, the second terminal device 104 may display front-end pages shown in an area 502 and an area 503, the administrator (which may be a person or a computer program) enters information (for example, may enter a name of an image and information about a signer). The second terminal device generates a message 504, and sends the message 504 to the image management apparatus. The message 504 includes the indication information of the target image and the description information of the signer. Correspondingly, the image management apparatus may obtain the indication information of the target image and the description information of the signer. Further, the image management apparatus may further return a related parameter (for example, a return parameter shown in an area 505) to the second terminal device, to indicate whether receiving succeeds, and the like.

Optionally, a plurality of signers may be pre-registered in the image management apparatus. Further, the image management apparatus may provide a plurality of signers to the second terminal device, so that a user of the second terminal device designates one or more signers as an object/objects that signs/sign the target image. Optionally, the image management apparatus may provide a function of registering a new signer. For example, the image management apparatus may receive description information (or may further include authentication information, such as one or more of an account, a name, a password, and a password of the signer) of a new signer A sent by the second terminal device, and register the signer (or may be specifically adding the signer A to a database that stores the description information of the signer).

Optionally, the image management apparatus may further periodically or aperiodically authenticate an identity of the administrator. For example, before the indication information that is of the target image and that is sent by the administrator is processed, the identity information of the administrator sent by the second terminal device is received. After authentication of the identity of the administrator based on the information about the administrator succeeds, the indication information that is of the target image and that is sent by the administrator is processed.

In another possible design, the image management system may be client/server (C/S) architecture software (that is, a client/server mode), or may be a (B/S) architecture system. The image management apparatus is used as a server, and the second terminal device may enter information through a client program, a browser, or the like, and send the information to the image management apparatus.

Step S402: The image management apparatus receives information about the signer and information about the target image that are sent by a first terminal device.

Specifically, the information about the signer may be one or more of an ID, a number, a name, an account, and a password of the signer, authentication information of the signer, and authentication information of a session.

The information about the target image may be one or more of a hash value, digest information, identity information, and the like of the target image. The hash value is an output value obtained based on a segment of data (for example, a character string, a number, or a file) according to a hash algorithm. In a possible design, when an image file is obtained by packaging according to a standard format, the hash value of the image may be obtained as one of attributes of the image file. The digest information is a type of hash value, and may also be referred to as an information digest or a digital digest. Generally, the digest information is a string of ciphertext of a fixed length (a length may be 128 bits, 256 bits, or another predefined length) into which a plaintext that needs to be encrypted is mapped according to an algorithm.

It should be noted that an algorithm for generating digest information is usually referred to as an information digest algorithm, and an algorithm for generating a hash value is usually referred to as a hash algorithm. The information digest algorithm is a type of hash algorithm. However, the information digest algorithm has a stricter condition, for example, a reverse operation cannot be performed, or a higher collision requirement is imposed.

It may be understood that the first terminal device sends the information about the signer and the information about the target image to the image management apparatus, and correspondingly, the image management apparatus receives the information about the signer and the information about the target image from the first terminal device. For example, the signer A uses the first terminal device, and enters information about the signer A and the information about the target image into the first terminal device, and the first terminal device sends the information about the signer and the information about the target image to the image management apparatus.

Figure 6:
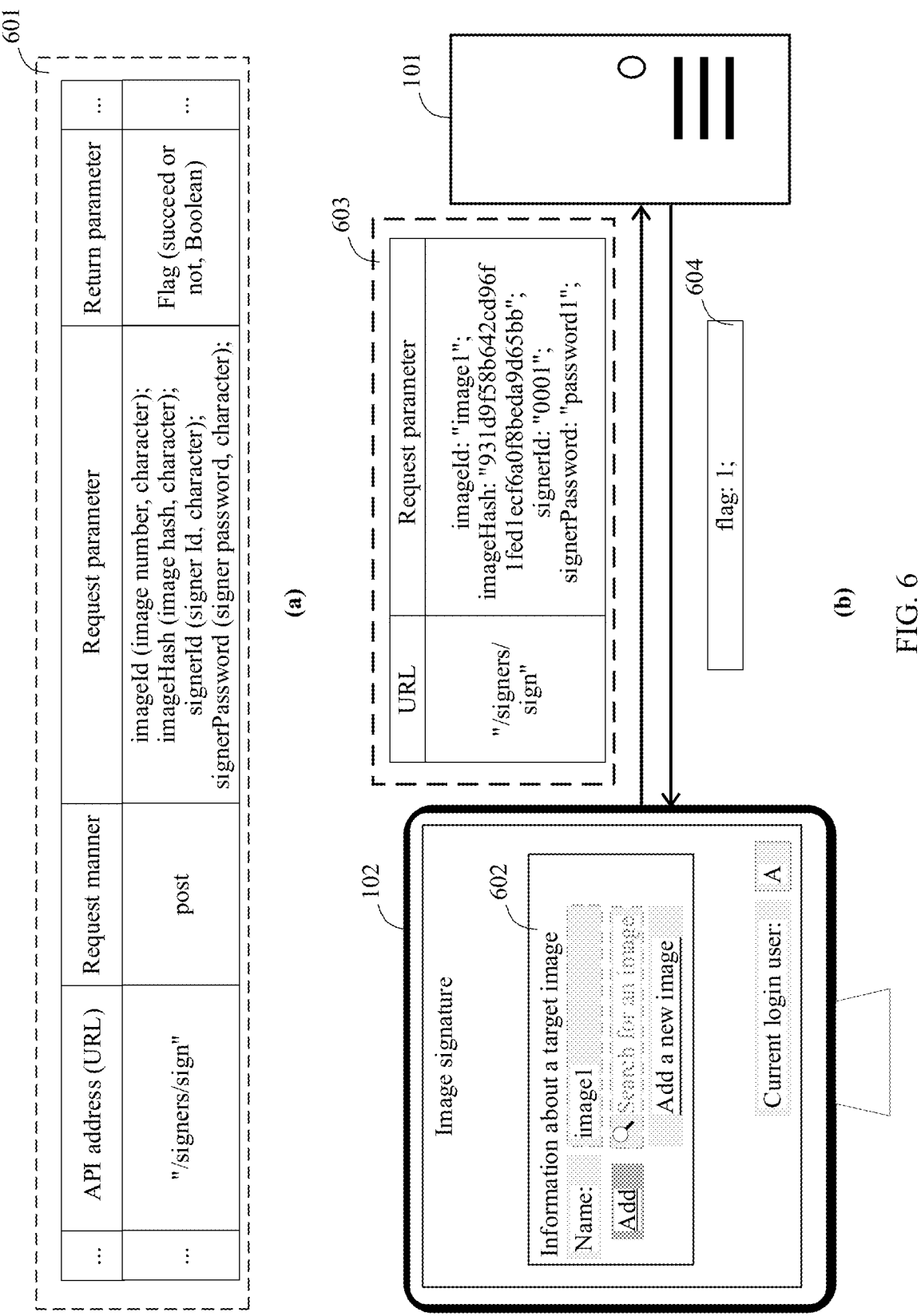
FIG. 6 is a schematic diagram of a scenario in which a first terminal device communicates with an image management apparatus according to an embodiment.

In a possible design, the image management apparatus may provide an API (for ease of description, referred to as a second API). The first terminal device may send the information about the signer and the information about the target image to the image management apparatus through the second API. For example, FIG. 6 is a schematic diagram of a possible scenario in which a first terminal device communicates with an image management apparatus according to an embodiment. A part (a) in FIG. 6 is a schematic diagram of possible attributes of an API 601. The attributes of the API 601 include an API address, a request method, a request parameter, and a return parameter. For specific explanations, refer to the foregoing explanations of the attributes of the API 501. It can be learned that the API 601 defines an API used when the second terminal sends information to the image management apparatus. The request parameter includes a number of an image (the field is imageId), a hash value of the image (the field is imageHash), an Id of the signer (the field is signerId), and a password of the signer (the field is signerPassword). Certainly, in a specific implementation, another request parameter may be further included, or some of the parameters shown in the API 601 do not exist. For example, the request parameter may not include the password of the signer. In some scenarios, when the signer A logs in to the first device, the first terminal device stores authentication information (for example, a cookie of authentication information of a session or an authentication file) of the signer A. When the first terminal device sends the information to the image management apparatus, the authentication information is included, so that the image management apparatus can identify an identity of the signer A.

With reference to a part (b) in FIG. 6, in a possible design, the first terminal device 102 may display a front-end page shown in an area 602, the administrator (which may be a person or a computer program) enters information (for example, may enter a name of an image and information about a signer). The first terminal device receives the indication information confirmed and submitted by the signer A to generate a message 603, and sends the message 603 to the image management apparatus. The message 603 includes the information about the target image and the information about the signer. Correspondingly, the image management apparatus may obtain the information about the target image and the information about the signer. Further, the image management apparatus may further return a related parameter (for example, a return parameter shown in an area 604) to the second terminal device, to indicate whether receiving succeeds, and the like.

In some possible designs, the information about the signer includes identity information of the signer. The image management apparatus may first verify an identity of the signer based on the identity information of the signer, and after the verification succeeds, continue to perform subsequent steps. If the verification fails, the image management apparatus may return, to the first terminal device, information indicating that identity verification fails, or may disconnect a communication connection to the first terminal device. The following describes four implementations of verifying the identity of the signer based on the identity information of the signer.

Implementation 1: The image management apparatus stores authentication information (for example, an account of the signer and a password or password of the signer) of the signer, and the identity information of the signer is the same as a parameter of the authentication information of the signer (for example, the identity information of the signer is also the account of the signer and the password or password of the signer). In this case, the image management apparatus may compare the identity information of the signer with the authentication information of the signer. If the identity information of the signer is the same as the authentication information of the signer, identity authentication of the signer succeeds. If the identity information of the signer is different from the authentication information of the signer, the identity authentication of the signer fails. Further, optionally, the authentication information of the signer may be sent by the second terminal device to the image management apparatus. For example, the administrator may define the authentication information of the signer when registering the signer.

Implementation 2: The image management apparatus stores contact information of the signer, for example, a phone number or an email address of the signer, and may authenticate the identity of the signer based on a dynamic password through short message service message verification, email verification, and another contact account. Optionally, the contact information of the signer may be provided by the administrator during registration, may be preconfigured in the image management apparatus, or may be obtained from a network device side.

Implementation 3: The image management apparatus stores a first password agreed on with the signer (the first password may also be understood as a shared key, a seed password, or the like). The image management apparatus may generate a random number and send the random number to the first terminal device. The first terminal device uses a one-way algorithm to perform hybrid calculation based on the first password and the random number to obtain the identity information of the signer, and sends the identity information to the image management apparatus. The image management apparatus obtains verification information through calculation by using the same method, and compares the verification information with the identity information of the signer for verification, to verify an identity of the user. Optionally, the first password may be a password set when the signer logs in to the image management system, or may be a password of the signer set by the administrator.

Implementation 4: The image management apparatus sends, to the first terminal device, authentication information of a session generated for the signer. The first terminal device sends a message including the authentication information of the session as the identity information of the signer to the image management apparatus, so that the image management apparatus can identify the identity of the signer. For example, the image management apparatus may generate a cookie (sometimes cookies, that is, a plural form) of the authentication information of the session for the signer A and send the cookie of the authentication information of the session to the first terminal device. The cookie is data (usually encrypted data) stored on a local device of the user for identifying the identity of the user and tracking a session, and is information temporarily or permanently stored by the device used by the user. Therefore, when sending information to the image management apparatus, the first terminal device may include the cookie as the identity information of the signer. The image management apparatus receives the cookie, and may authenticate the identity of the signer based on the cookie.

It may be understood that, in a specific implementation, only one of the identity authentication manners may be used, or a combination of a plurality of identity authentication manners may be used. In addition, optionally, when performing identity authentication, the image management apparatus may periodically or aperiodically authenticate the identity of the signer, and does not necessarily authenticate the identity of the signer before or after an action is performed. For example, the image management apparatus may perform identity authentication when the signer logs in, or may perform identity authentication at intervals after the signer logs in to a system, or may perform identity authentication when some important operations are performed.

Step S403: The image management apparatus obtains a signature file based on the information about the signer and the information about the target image.

Specifically, the signature file is generated based on a digest of the target image. There may be at least the following two solutions in which the image management apparatus obtains the signature file based on the information about the signer and the information about the target image.

Solution 1: The information about the signer corresponds to a key of the signer, and the information about the target image includes a hash value or digest information of the target image. The image management apparatus may generate the signature file by signing the hash value of the target image based on a key of the signer. Specifically, a signature method used to generate the signature file may be a signature operation, for example, a modulo operation, an exclusive OR operation, or a logarithmic and exponential operation, or may be a signature algorithm, for example, an RSA digital signature, a digital signature standard (DSS) digital signature, an ElGamal digital signature, or an elliptic curve digital signature algorithm (ECDSA) digital signature.

For example, a key K1 of the signer may be determined based on an ID of the signer. The information about the target image includes the hash value hash (or may be replaced with the digest information) of the target image. The image management apparatus generates a signature file S1 according to a DSS algorithm based on the key K1 and the hash value hash of the image, for example, S1=DSS (K1, hash).

The key of the signer may be a public key, a private key, or a symmetric key. Generally, in some scenarios, a key pair may be used, and the key pair includes a public key and a private key, for example, when a used signature algorithm is an asymmetric algorithm. Alternatively, in some scenarios, a key may be used, for example, during point-to-point communication and when a used signature algorithm is a symmetric algorithm.

Solution 2: If detecting (or determining through monitoring or receiving) that an image is packed or detecting that an image is pushed to the image repository, the image management apparatus invokes a predefined interface or a signature algorithm to sign a hash value of the image based on a key of a signer designated by the image to obtain a signature file. The signature file may be stored in a to-be-extracted file pool. After the signer uploads the information about the signer and the information about the target image with the first management apparatus, the signature file corresponding to the signer may be extracted from the to-be-extracted file pool based on the information about the signer and the information about the target image. In this way, a signature file generation function may be deployed on a dedicated signature server and a network side device, or a signature service provider provides a signature file generation function, so that computing consumption of the image management apparatus is reduced. In addition, when signing, the signer directly extracts the completed signature file, so that a waiting time of the signer can be reduced, and user experience is improved.

Step S404: If a first digest that is of the target image and that is returned by a container platform matches a second digest obtained based on the signature file, the image management apparatus indicates the container platform to allow use of the target image to start a target container.

Specifically, before the container platform starts a container corresponding to an image, the image management apparatus receives a digest that is of the image and that is returned by the container platform. For ease of description, a digest that is of the target image and that is returned by the container platform is referred to as the first digest.

A digest of the target image when being signed may be obtained based on the signature file, and is referred to as the second digest for ease of description. It may be understood that because the signature file is obtained by signing based on the key of the signer and the information about the target image, the second digest of the signature file may be obtained based on the public key corresponding to the signer and the signature file.

It may be determined, by comparing the first digest with the second digest, whether the target image is tampered with. It may be understood that, if the first digest matches the second digest, it indicates that the target image is not tampered with, and the image management apparatus indicates the container platform to allow use of the target image to start the target container. Optionally, if the first digest does not match the second digest, it indicates that the content of the target image is changed, and the image management apparatus may indicate the container platform to reject use of the target image to start the target container.

Figure 7:
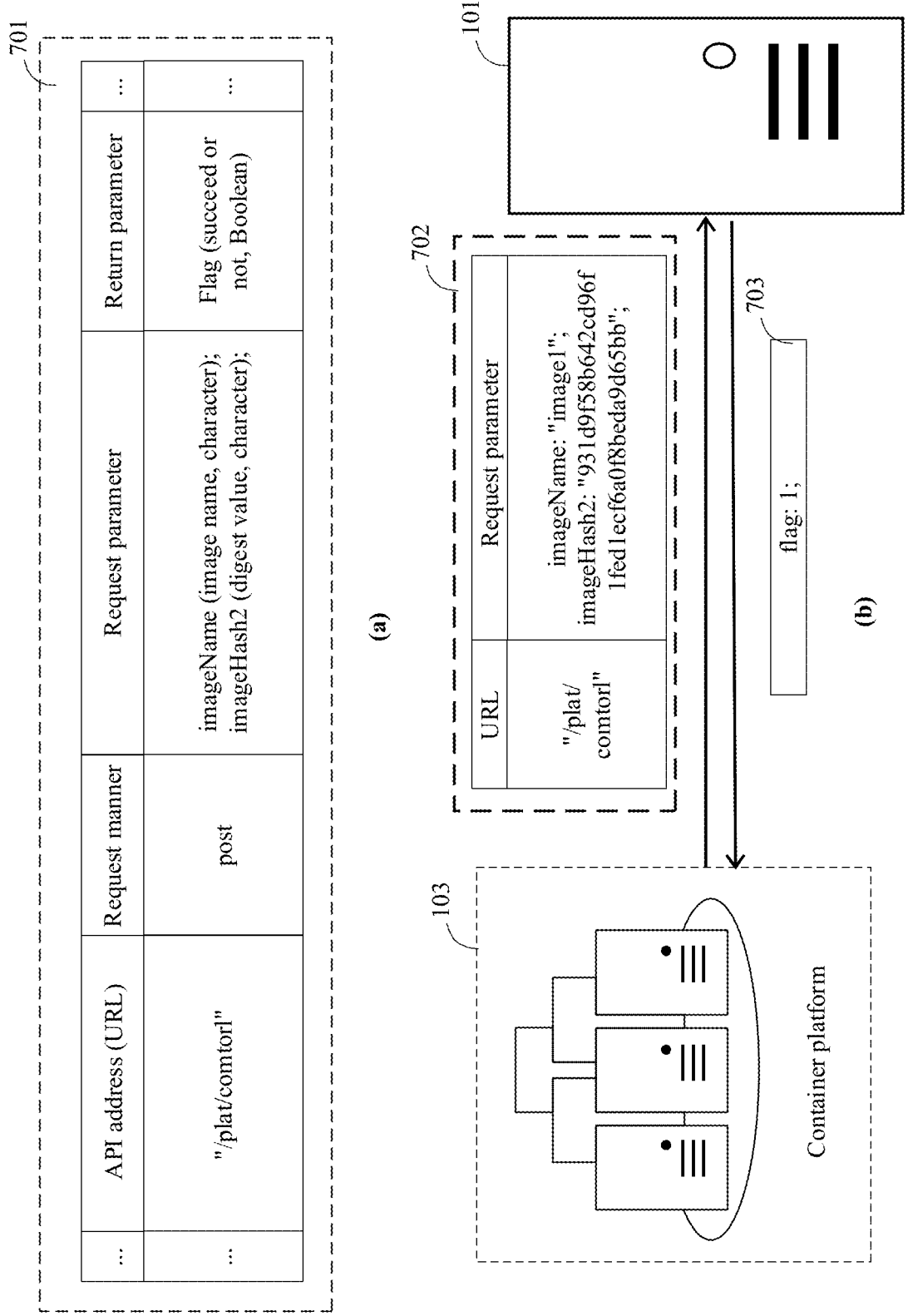
FIG. 7 is a schematic diagram of a scenario in which a container platform communicates with an image management apparatus according to an embodiment.

In a possible design, the image management apparatus may provide an API (referred to as a third API for ease of description), and the container platform may return the first digest to the image management apparatus through the third API. For example, FIG. 7 is a schematic diagram of a possible scenario in which a container platform communicates with an image management apparatus according to an embodiment. A part (a) in FIG. 7 is a schematic diagram of possible attributes of an API 701. The attributes of the API 701 include an API address, a request method, a request parameter, and a return parameter. For specific explanations, refer to the foregoing explanations of the attributes of the API in FIG. 5. It can be learned that the API 701 defines an API used when the container platform sends information to the image management apparatus. The request parameter includes a name of an image (the field is imageName, or the name of the image may be replaced with one or more of a number of the image, an ID of the image, a tag of the image, and the like) and a value of the first digest (the field is imageHash2). Certainly, in a specific implementation, another request parameter may be further included, or some parameters shown in the API 701 are not included. For example, the request parameter may also include an ID of the container platform, and the like.

With reference to a part (b) of FIG. 7, before starting a container based on the target image image1, the container platform 103 returns a digest of the image image1 to the image management apparatus (in 101 FIG. 7, for example, the digest is "931d9f58b642cd96f1fed1ecf6a0f8beda9d65bb", and may be another digest in a specific implementation), and returns the digest to the image management apparatus 101 through a message 702. Correspondingly, the image management apparatus may obtain the first digest of the target image, match the digest with the digest obtained based on the signature file, and return a message 703 to the container platform, to indicate a matching result or indicate whether to allow use of the target image image1 to start the container.

It may be understood that if the signature file is obtained based on the hash value of the target image, the information about the target image obtained after the signature verification is the hash value of the target image. However, for ease of description, the information about the target image obtained after the signature verification is referred to as the second digest, and this is not intended to limit that the second digest is necessarily a digital digest. Correspondingly, if the signature file is obtained based on the hash value of the target image, the second digest that is of the target image and that is returned by the container platform is also the hash value of the target image, to facilitate comparison.

In the method described in FIG. 4, the image management apparatus obtains the information about the signer and the information about the target image with the first terminal device, and may obtain the signature file of the target image based on the information about the signer and the information about the target image. Because a mapping relationship exists between a digest of the target image and content of the target image, if the content of the target image is tampered with, the digest of the target image also changes correspondingly. Therefore, when the container platform starts the container based on the target image, if it is verified that the first digest of the target image matches the second digest of the target image when the signature file is generated, it indicates that the content of the target image is not tampered with. Therefore, the container platform may be indicated to allow use of the target image to start the container. In this way, security and integrity of the target image can be controlled, and security of the content of the target image and security of the container platform are ensured.

In addition, the signer can sign the image with only the first terminal device, and the signer does not need to generate a key pair, store a key, generate a signature file, or the like on a local terminal. This improves security of the image, reduces operation complexity of the signer, and improves user experience.

The foregoing method embodiment may be performed before an image is developed, when an image is pushed, or when an image is used. Therefore, the foregoing method embodiment may be used to track an entire life cycle of the image, and may be coupled with a pipeline for image construction, to adapt to a current cloud native development technology.

In addition, it should be noted that, a data link for receiving and sending information between the image management apparatus and the first terminal device, the second terminal device, or the container platform may include various types of connection media, and may be specifically a wired link (for example, an optical fiber or a twisted pair), a wireless link, a combination of a wired link and a wireless link, or the like. For example, technologies used for the data link may include 802.11b/g, Bluetooth, ZigBee, Global System for Mobile Communications (GSM), General Packet Radio Service (GPRS), Universal Mobile Telecommunications System (UMTS), and ultra-wideband (UWB) technologies. Certainly, another technology may be used to support communication between the image management apparatus and the first terminal device, the second terminal device, or the container platform.

The foregoing method embodiment shown in FIG. 4 includes many possible implementation solutions. The following separately describes some implementation solutions with reference to FIG. 8, FIG. 9, and FIG. 10. It should be noted that, for related concepts or operations or logical relationships that are not explained in FIG. 8, FIG. 9, and FIG. 10, refer to corresponding descriptions in the embodiment shown in FIG. 4. Therefore, details are not described again.

Figure 8:
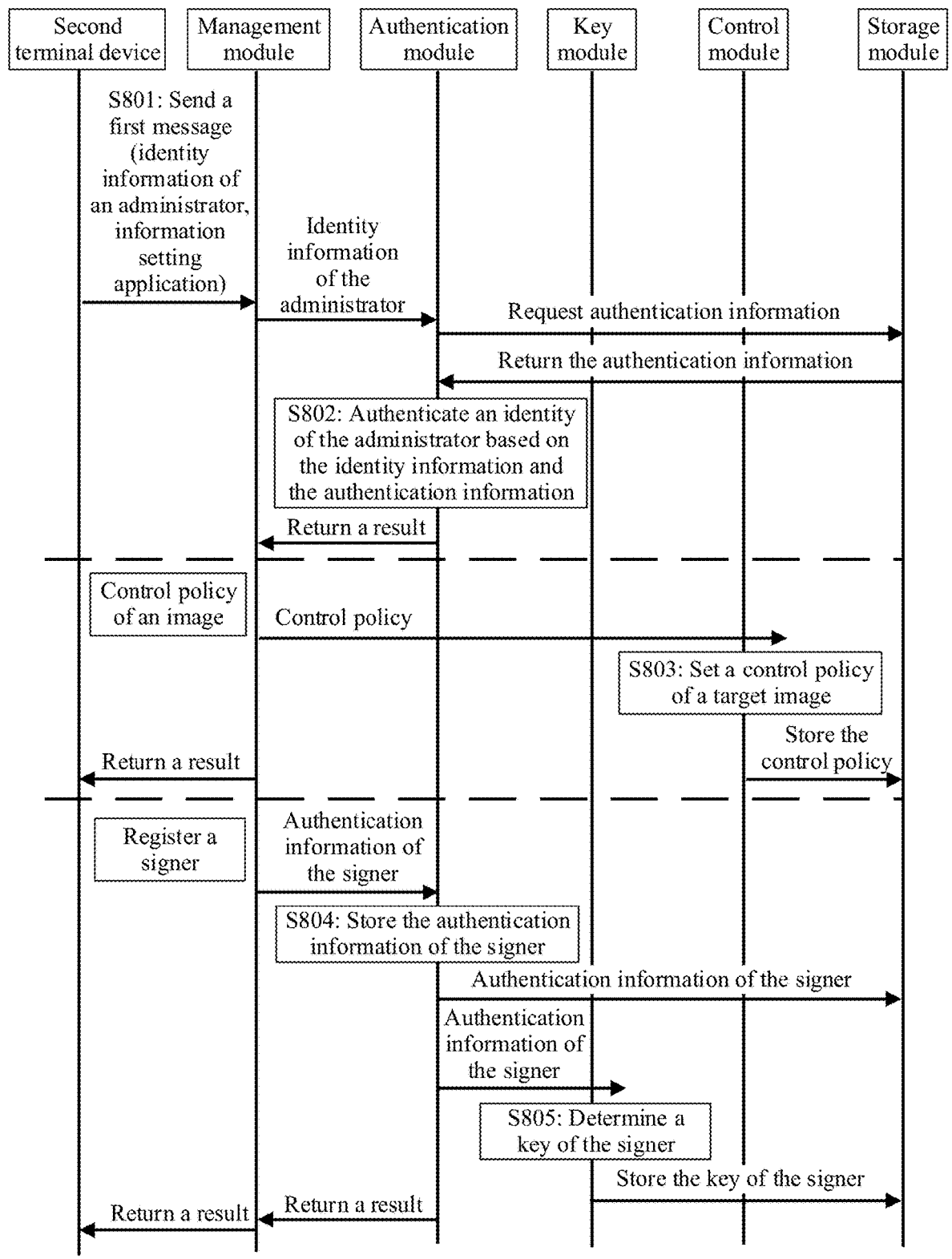
FIG. 8 is a schematic flowchart of another image management method according to an embodiment.

FIG. 8 is a schematic flowchart of another image management method according to an embodiment. The method may be implemented based on the image management system shown in FIG. 1. The image management method includes at least the following steps.

Step S801: A management module of an image management apparatus receives, through a first API, first information sent by a second terminal device, where the first information includes identity information of an administrator and an information setting application.

Specifically, the information setting application may specifically include one or more of a control policy and authentication information of a signer. In a specific implementation, the information setting application may also be referred to as control information.

The control policy includes indication information of a target image and description information of the signer. For the indication information of the target image and the description information of the signer, refer to detailed descriptions in step S401.

Specifically, the identity information of the administrator may include one or more of an ID, a number, a name, an account, and a password of the administrator, the authentication information of the signer, and authentication information of a session.

Step S802: An authentication module of the image management apparatus determines an identity of the administrator based on the identity information of the administrator and authentication information of the administrator.

Specifically, the management module may send the authentication information of the administrator in the first message to the authentication module to authenticate the identity of the administrator. The authentication module may request the authentication information of the administrator from a storage module based on the identity information of the administrator. After receiving the authentication information of the administrator returned by the storage module, the authentication module authenticates the identity of the administrator based on the identity information of the administrator and the authentication information of the administrator.

In a design, the authentication module compares the identity information of the administrator sent by the management module with the authentication information returned by the storage module. If the identity information is the same as the authentication information returned by the storage module, identity authentication succeeds. If the identity information is different from the authentication information returned by the storage module, the identity authentication fails. For example, the identity information of the administrator is "account: admin, password: adminpw". If the requested authentication information of the administrator is also "account: admin, password: adminpw", the identity authentication of the administrator succeeds.

It should be noted that, for ease of understanding, a plaintext form is used in the description. In a specific implementation process, the authentication information returned by the storage module may be encrypted, or information returned by the storage module may be a digest value of the authentication information. For example, content returned by the storage module is a digest of the authentication information. In this case, the authentication module generates a digest based on the identity information of the administrator, and then compares the generated digest with the digest returned by the storage module to determine whether the identity authentication succeeds.

Further, the authentication module may return an authentication result to the management module. If identity authentication fails, the management module may return authentication failure indication information (for example, return operation failure information through a return value of the API) to the second terminal device, so that the second terminal device re-submits authentication and the like. If the identity authentication succeeds, the administrator can process the information setting application.

Step S803: When the information setting application of the administrator includes the control policy, a control module of the image management apparatus sets the control policy of the target image.

Specifically, when the information setting application of the administrator includes the control policy, the control module may send the control policy to the control module. The control policy includes indication information of a target image and description information of the signer. The control module designates, based on the indication information of the target image and the description information of the signer, the signer as an object for signing the target image. When there is a subsequent application for verifying the target image, whether the target image has a signature file of the signer, whether the signature file is valid, and the like are checked.

Further, the control module may control content of the control policy in the storage module, and a specific control operation may be adding, updating, or deleting the control policy.

Step S804: When the information setting application of the administrator includes the authentication information of the signer, the authentication module of the image management apparatus stores the authentication information of the signer.

Specifically, the management module sends the authentication information of the signer to the authentication module. After receiving the authentication information of the signer, the authentication module may store the authentication information of the signer in the storage module.

In some implementation scenarios, the information setting application of the administrator may further apply for deleting the authentication information of the signer. In this case, the authentication module may request the storage module to delete the authentication information of the corresponding signer.

Optionally, the image management method shown in FIG. 8 may further include step S805. Details are specifically as follows:

Step S805: A key module of the image management apparatus determines a key of the signer.

Specifically, the authentication module requests the key module to generate a public-private key pair of the signer. Specifically, the request may include the authentication information of the signer (which may include all authentication information, for example, an account and a password, or may include only some information, for example, only an account).

Further, after receiving the request from the authentication module, the key module generates the public-private key pair corresponding to the signer. After generating the key pair, the key module sends the public-private key pair to the storage module for storage.

In some implementation scenarios, the information setting application of the administrator may further apply for deleting a key corresponding to the signer. In this case, the authentication module may request the key module to delete the key of the signer. In this case, the key module may delete the key corresponding to the signer from the storage module.

Figure 9:
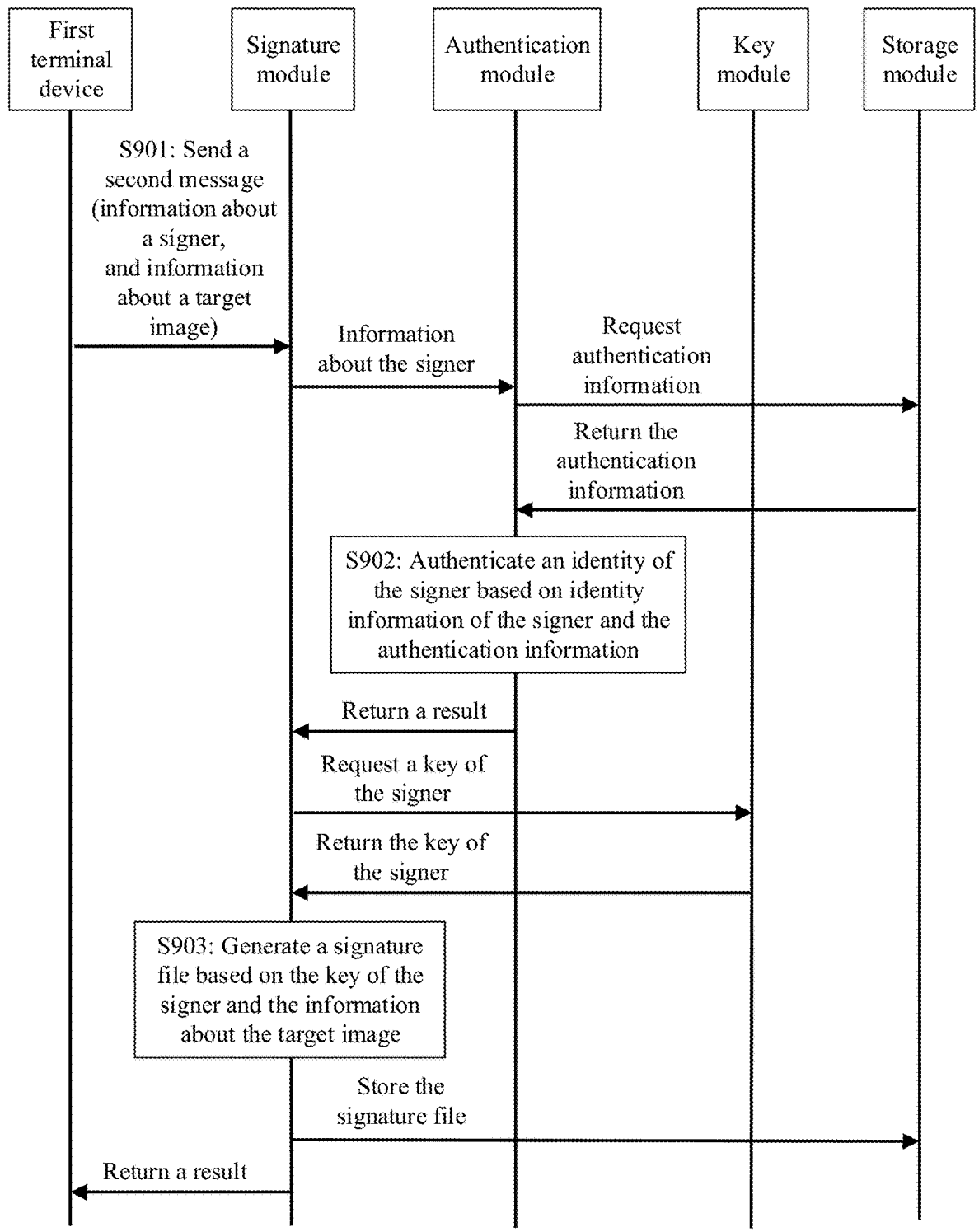
FIG. 9 is a schematic flowchart of an image signature method according to an embodiment.

FIG. 9 is a schematic flowchart of an image signature method according to an embodiment. The method may be implemented based on the image management system shown in FIG. 1. The image management method includes at least the following steps.

Step S901: A signature module of an image management apparatus receives, through a second API, second information sent by a first terminal device, where the second information includes information about a signer and information about a target image.

Specifically, the first terminal device applies for signature operation by invoking the second API. An input parameter of the API may be included in the second information, and may be specifically the information about the signer and the information about the target image. For the information about the signer and the information about the target image, refer to specific descriptions in step S402. Details are not described herein again.

In a possible implementation, the information about the signer is identity information of the signer, and the information about the target image includes digest information of the target image. Optionally, the information about the target image further includes one or more of an ID, a name, and the like of the target image.

Step S902: An authentication module of the image management apparatus authenticates an identity of the signer based on the identity information of the signer and authentication information.

Specifically, after receiving authentication information of the signer, the signature module sends the authentication information of the signer to the authentication module. The authentication module authenticates the identity of the signer (for example, performs authenticity detection on the identity of the signer).

The authentication module may request the authentication information of the signer from a storage module. Specifically, the authentication module may query the storage module for the authentication information of the signer based on a number, an account, an ID, or the like of the signer. The storage module returns the stored authentication information of the signer to the authentication module. The authentication module authenticates the identity of the signer based on the identity information of the signer and the authentication information of the signer.

In a design, the authentication module compares the identity information of the signer sent by the signature module with the authentication information of the signer returned by the storage module. If the identity information of the signer is the same as the authentication information of the signer returned by the storage module, identity authentication succeeds. If the identity information of the signer is different from the authentication information of the signer, the identity authentication fails. For example, the identity information of the signer is "account: signer1, password: password1". If the requested authentication information of the administrator is also "account: signer1, password: password1", the identity authentication of the signer succeeds.

It should be noted that, for ease of understanding, the description is in a plaintext form. In a specific implementation process, the authentication information returned by the storage module may be encrypted, or information returned by the storage module may be a digest value of the authentication information. For example, content returned by the storage module is an encrypted account and an encrypted password. In this case, the authentication module requests to decrypt the returned content based on a corresponding decryption key, and then compares the decrypted content with the identity information.

Further, the authentication module may return an authentication result to the signature module. If the identity authentication fails, the signature module may return authentication failure indication information (for example, return signature operation failure information through a return value of the API) to the first terminal device, so that the first terminal device re-submits authentication and the like. If the identity authentication succeeds, subsequent signature operations can be performed.

Step S903: The signature module of the image management apparatus generates a signature file based on a key of the signer and the information about the target image.

Specifically, the signature module requests the key of the signer from the key module, and the key module requests a stored private key of the signer from the storage module. Correspondingly, the storage module returns the private key of the signer to the key module, and the key module sends the private key to the signature module.

The signature module receives the private key of the signer, and performs signature calculation based on the private key and the information about the target image, to obtain a signature file of the image.

Further, the signature module sends the signature file of the image to the storage module for storage. Optionally, the signature module may return, based on a return value (or a return parameter) of the second API, signature success indication information.

Figure 10:
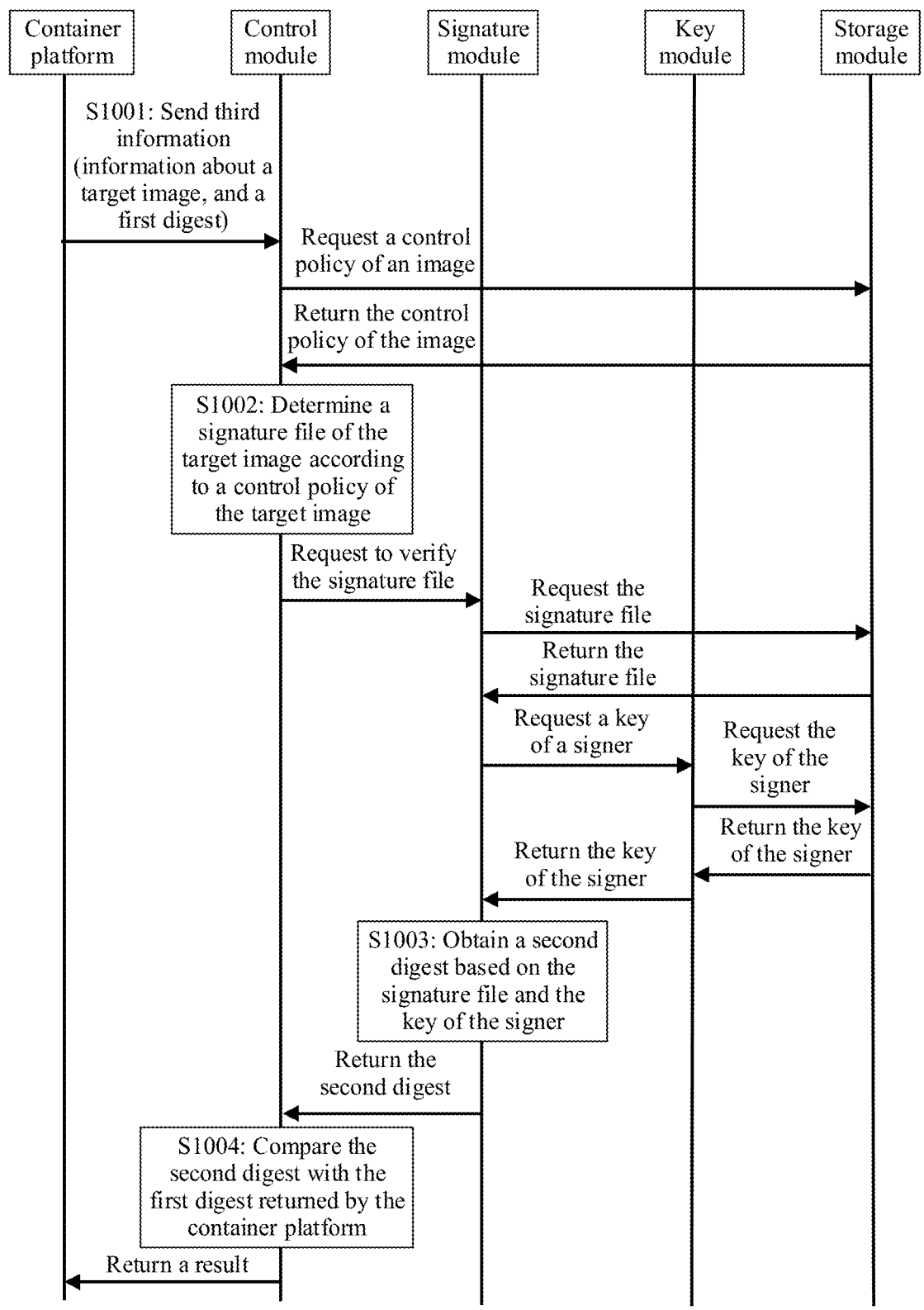
FIG. 10 is a schematic flowchart of another image signature method according to an embodiment.

FIG. 10 is a schematic flowchart of another image control method according to an embodiment. The method may be implemented based on the image management system shown in FIG. 1. The image management method includes at least the following steps.

Step S1001: A control module of an image management apparatus receives, through a third API, third information sent by a container platform, where the third information includes information about a target image, and may further include a first digest. The information about the target image may include an identification, a number, an ID, and the like of the target image.

Specifically, the container platform uses an image signature control function by invoking the third API. An input parameter of the API may be included in the third information, and may be specifically the information (including one or more of a name, a tag, and a hash value of an image, and information about a group that needs to pull an image) about the target image pulled by the container platform. The third information may also be referred to as request information.

It may be understood that when the third information does not include the first digest, the container platform may send the first digest of the target image based on other information.

Step S1002: The control module of the image management apparatus determines a signature file of the target image according to a control policy of the target image.

Specifically, after receiving the third information (or request information), the control module requests the control policy of the target image from a storage module. Correspondingly, the storage module returns the control policy of the target image to the control module. The control module requests the signature file of the target image from a signature module.

It may be understood that the control policy includes the description information of a signer. Therefore, a signature file of the signer is required when an image is started.

Step S1003: The signature module of the image management apparatus obtains a second digest based on the signature file and a key of the signer.

Specifically, the signature module requests the signature file of the target image from the storage module, and correspondingly, the storage module returns the signature file of the target image to the signature module. It may be understood that when signature files of a plurality of signers exist, the storage module returns signature files corresponding to the plurality of signers.

Further, the signature module requests a public key of the signer from a key module, and the key module requests the stored public key of the signer from the storage module. Correspondingly, the storage module returns the public key of the signer to the key module, and the key module further returns the public key of the signer to the signature module.

The signature module obtains the second digest of the target image through calculation based on the signature file and the public key of the signer, and returns the second digest to the control module.

In a possible design, the signature file is generated based on the hash value of the target image and information about the signer (for example, one or more of an account, an ID, and the like of the signer), and the signature module may unsign the signature file based on the public key of the signer, to obtain the second digest of the target image and the information about the signer. Further, the signature module may compare the information about the signer obtained through unsigning with information about a designated signer of the image, to determine whether the signature file is tampered with.

Step S1004: The control module of the image management apparatus compares the second digest with the first digest returned by the container platform.

Specifically, the control module performs calculation and comparison based on the second digest and the first digest returned by the container platform, to verify integrity of image content. If the second digest is consistent with a result obtained through calculation based on the first digest, it indicates that the target image is not tampered with, and the control module returns, to the container platform, indication information indicating to allow use of the target image to start a container. If the second digest is inconsistent with a result obtained through calculation based on the first digest, the control module feeds back, to the container platform, prompt information indicating that information of the image is tampered with or indication information indicating to reject use of the target image to start the image.

Further, if the signature file that is returned by the signature module and that is received by the control module lacks a signature file of one or more signers, it indicates that the signature of the target image is incomplete. In this case, the image management apparatus may feed back, to the container platform, prompt information indicating that the signature file is incomplete or indication information indicating to reject use of the target image to start the image.

In some possible designs, an operation shown in step S1004 may also be completed by the signature module. Specifically, the signature module performs calculation and comparison based on the first digest, the public key of the signer, and a signature file of an image that are returned by the container platform to verify integrity of image content, and obtain a verification result (indicating that the verification succeeds or fails). The signature module returns the signature file and the verification result corresponding to the signature file to the control module. The control module checks whether there are signature files of all signers and verification results of the files of the signers. If the signature files are complete and the verification results of the signature files all indicate that verification succeeds, the control module indicates the container platform to allow use of the target image to start the container.

The methods in embodiments are described above in detail, and apparatuses in embodiments are provided below.

Figure 11:
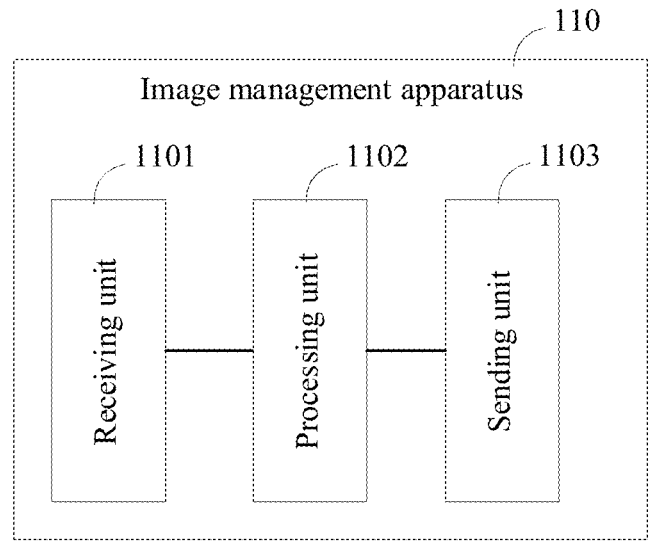
FIG. 11 is a schematic diagram of a structure of an image management apparatus according to an embodiment.

FIG. 11 is a schematic diagram of a structure of an image management apparatus 110 according to an embodiment. The image management apparatus 110 may be the image management apparatus in the embodiment shown in FIG. 4, or may be a module in the image management apparatus, such as a chip or an integrated circuit. The image management apparatus 110 is configured to implement the foregoing image management method, for example, the image management method described in any one of embodiments in FIG. 4, FIG. 8, FIG. 9, and FIG. 10.

Further, the image management apparatus 110 may include a receiving unit 1101 and a processing unit 1102. Optionally, a sending unit 1103 may further be included. Detailed descriptions of the units are as follows:

The receiving unit 1101 is configured to receive information about a signer and information about a target image that are sent by a first terminal device, where the signer is an object designated to sign the target image.

The processing unit 1102 is configured to obtain a signature file based on the information about the signer and the information about the target image.

The processing unit 1102 is configured to: if a first digest that is of the target image and is returned by a container platform matches a second digest obtained based on the signature file, indicate the container platform to allow use of the target image to start a container.

In the foregoing embodiment, the image management apparatus 110 obtains the information about the signer and the information about the target image with the first terminal device, and may obtain the signature file of the target image based on the information about the signer and the information about the target image. Because a mapping relationship exists between a digest of the target image and content of the target image, if the content of the target image is tampered with, the digest of the target image also changes correspondingly. Therefore, when the container platform starts the container based on the target image, if it is verified that the first digest of the target image matches the second digest of the target image when the signature file is generated, it indicates that the content of the target image is not tampered with. Therefore, the image management apparatus 110 may indicate the container platform to allow use of the target image to start the container. In this way, security and integrity of the target image can be controlled, and security of the content of the target image and security of the container platform are ensured.

In addition, the signer can sign the image with only the first terminal device, and the signer does not need to generate a key pair, store a key, generate a signature file, or the like on a local terminal. This improves security of the image, reduces operation complexity of the signer, and improves user experience.

The image management apparatus 110 may manage the target image in an image development process, an image push process, and an image use process. Therefore, the foregoing method embodiment may be used to track an entire life cycle of the image, and may be coupled with a pipeline for image construction, to adapt to a current cloud native development technology.

In another possible implementation, the receiving unit 1101 is further configured to: receive indication information of the target image and description information of the signer that are sent by a second terminal device, where the description information of the signer indicates the signer that signs the target image.

It can be learned that the second terminal device may indicate which signers are required to sign the target image. In a possible design, an administrator enters a control policy of an image with the second terminal device. The control policy includes the indication information of the target image and the description information of the signer. The control policy is for controlling the target image. It can be learned that the administrator only needs to enter the control policy to control the image. This improves user experience. Especially, when a plurality of images needs to be managed (for example, an enterprise or an organization manages developed images), decoupling between an image research and development team, an image management team, and an image signer may be implemented. This improves user experience.

In another possible implementation, the indication information of the target image includes an identity of the target image and/or identification information of a container group used to run the target image.

A control function of a single image can be implemented, and a plurality of images that need to run in a container group can be controlled, to implement image control functions of various granularities, and satisfy a requirement of a user for controlling a single image, a plurality of images, and an image that needs to run in a container group.

In another possible implementation, the information about the signer includes identity information of the signer, and the processing unit 1102 is further configured to: determine, based on the identity information, that identity authentication of the at least one signer succeeds.

In the foregoing description, image management apparatus 110 may authenticate an identity of a signer. In this way, an untrusted signer can be kept from signing a signature file. This improves security of an image.

In another possible implementation, the receiving unit 1101 is further configured to receive authentication information of the signer sent by the second terminal device.

The processing unit 1102 is further configured to determine, based on the authentication information of the signer and the identity information, that identity verification of the signer succeeds.

The foregoing provides a method for authenticating an identity of a signer. An administrator, an automated management program, or the like may set the authentication information of the signer with the second terminal device. When the first terminal device uploads the identity information of the signer, the image management apparatus 110 may compare the identity information with the authentication information. If the identity information is consistent with the authentication information, it indicates that an identity of the signer is trusted.

In another possible implementation, the apparatus supports information transmission between the second terminal device, the first terminal device, and the container platform through an API.

The foregoing describes a communication manner. The image management apparatus 110 may be connected to the second terminal device, the first terminal device, and the container platform by an API interface. The foregoing device can implement functions such as image management, image signature, and image startup control by invoking a related function only through the API interface. This reduces difficulty of user operations.

In another possible implementation, the processing unit 1102 is further configured to generate a key pair corresponding to the signer, where the key pair includes a public key and a private key.

In the foregoing description, the image management apparatus 110 may generate a key pair in an image management process, and the key pair may be used in a signature, identity authentication, and a startup control process. Further, the key pair may be stored in the image management apparatus 110, and the user does not need to locally store a public key and a private key, so that key leakage can be avoided.

In another possible implementation, the information about the target image includes a hash value of the target image; the information about the signer corresponds to the private key of the signer; and the processing unit 1102 is further configured to generate the signature file based on the private key of the signer and the hash value of the target image.

The foregoing describes a manner in which the image management apparatus 110 generates a signature file. Information about an image includes a hash value of an image, and a signature file may be generated based on the private key of the signer and the hash value of the image. Because a mapping relationship exists between content of an image and a hash value of the image, if the content of the image is tampered with, a digest of the image also changes accordingly, so that whether the content of the image is tampered with can be identified based on the hash value of the image.

In another possible implementation, the receiving unit 1101 is further configured to receive a request message sent by the container platform, where the request information requests to use the target image to start the container on the container platform. Further, the request message includes the first digest.

Specifically, the container platform may add the indication information of the target image to the request message, and invoke startup control of the image through the API interface. In this way, when the container platform starts the container, the digest information of the target image is provided to the image management apparatus 110, and whether the image is secure may be determined based on fed-back indication information. An image check function of the container platform does not need to be adjusted, so that container platforms provided by a plurality of service providers can be quickly compatible.

In another possible implementation, the processing unit 1102 is further configured to add the authentication information of the signer to a signer database based on the authentication information of the signer.

In another possible implementation, the signer includes a first signer and a second signer; and the first terminal device includes a first subdevice and a second subdevice, where the first subdevice is a device used by the first signer, and the second subdevice is a device used by the second signer.

According to embodiments, a plurality of signers may separately upload, with one or more devices, information used for signature, to separately obtain signature files, so that a multi-person signature mechanism is implemented.

In another possible implementation, the sending unit 1103 is configured to send information to the first terminal device, the second terminal device, and the container platform. For example, the sending unit sends the indication information to the container platform, to indicate whether to allow use of the target image to start a target container.

It may be understood that in the apparatus embodiments, division of the plurality of units or modules is merely logical division performed based on functions, and is not intended to limit a specific structure of the apparatus. In a specific implementation, some functional modules may be subdivided into more small functional modules, or some functional modules may be combined into one functional module. However, no matter whether these functional modules are subdivided or combined, a general procedure performed in an image management process is the same. For example, the receiving unit 1101 and the sending unit 1103 in the apparatus 110 may also be collectively referred to as a communication unit. Usually, each unit corresponds to respective program code (or program instructions). When the program code corresponding to the unit is run on the processor, the unit is controlled by the processing unit to perform a corresponding procedure to implement a corresponding function.

Figure 12:
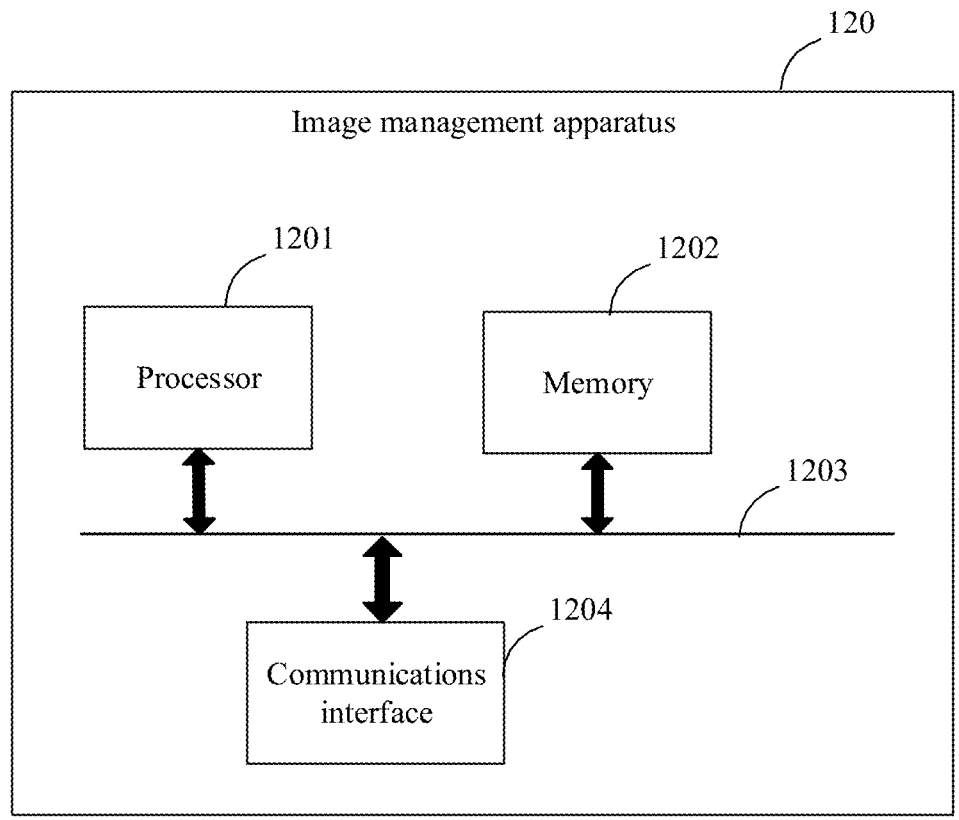
FIG. 12 is a schematic diagram of a structure of another image management apparatus according to an embodiment.

FIG. 12 is a schematic diagram of a structure of an image management apparatus 120 according to an embodiment. The image management apparatus 120 may include at least one memory 1201, at least one processor 1202, and a communications interface 1204. Optionally, a bus 1203 may be further included. The memory 1201, the processor 1202, and the communications interface 1204 are connected by the bus 1203.

The memory 1201 is configured to provide storage space, and the storage space may store data such as an operating system and computer instructions. The memory 1201 may be one or a combination of a RAM, a ROM, an EPROM, a portable ROM (CD-ROM), or the like.

The processor 1202 is a module that performs an arithmetic operation and/or a logic operation, and may be specifically one or a combination of processing modules such as a central processing unit (CPU), a graphics processing unit (GPU), a microprocessor unit (MPU), an application-specific integrated circuit (ASIC), a field-programmable gate array (FPGA), and a complex programmable logic device (CPLD).

The communications interface 1204 is configured to receive data sent from the outside and/or send data to the outside, and may be a wired link interface including an Ethernet cable, or may be a wireless link (Wi-Fi, Bluetooth, universal wireless transmission, an in-vehicle short-distance communication technology, or the like) interface. Optionally, the communications interface 1204 may further include a transmitter (for example, a radio frequency transmitter or an antenna), a receiver, or the like coupled to the interface.

The processor 1202 of the image management apparatus 120 is configured to read the computer instructions stored in the memory 1201, to perform the foregoing image management method, for example, the image management method described in any one of embodiments in FIG. 4, FIG. 8, FIG. 9, and FIG. 10.

For example, the image management apparatus 120 may be the image management apparatus in any one of embodiments in FIG. 4, FIG. 8, FIG. 9, and FIG. 10. The processor 1202 of the image management apparatus 120 is configured to read the computer instructions stored in the memory 1201, and is configured to perform the following operations: receiving, through the communications interface 1204, information about a signer and information about a target image that are sent by a terminal device, where the signer is an object designated to sign the target image; obtaining a signature file based on the information about the signer and the information about the target image; and if a first digest that is of the target image and is returned by a container platform matches a second digest obtained based on the signature file, indicating the container platform to allow use of the target image to start a container.

In the foregoing embodiment, the image management apparatus 120 obtains the information about the signer and the information about the target image with the first terminal device, and may obtain the signature file of the target image based on the information about the signer and the information about the target image. Because a mapping relationship exists between a digest of the target image and content of the target image, if the content of the target image is tampered with, the digest of the target image also changes correspondingly. Therefore, when the container platform starts the container based on the target image, if it is verified that the first digest of the target image matches the second digest of the target image when the signature file is generated, it indicates that the content of the target image is not tampered with. Therefore, the image management apparatus 120 may indicate the container platform to allow use of the target image to start the container. In this way, security and integrity of the target image can be controlled, and security of the content of the target image and security of the container platform are ensured.

In addition, the signer can sign the image with only the first terminal device, and the signer does not need to generate a key pair, store a key, generate a signature file, or the like on a local terminal. This improves security of the image, reduces operation complexity of the signer, and improves user experience.

The image management apparatus 120 may manage the target image in an image development process, an image push process, and an image use process. Therefore, the foregoing method embodiment may be used to track an entire life cycle of the image, and may be coupled with a pipeline for image construction, to adapt to a current cloud native development technology.

In another possible implementation, the processor 1202 is further configured to: receive, through the communications interface 1204, indication information of the target image and description information of the signer that are sent by a second terminal device, where the description information of the signer indicates the signer that signs the target image.

It can be learned that the second terminal device may indicate which signers are required to sign the target image. In a possible design, an administrator enters a control policy of an image with the second terminal device. The control policy includes the indication information of the target image and the description information of the signer. The control policy is for controlling the target image. It can be learned that the administrator only needs to enter the control policy to control the image. This improves user experience. Especially, when a plurality of images needs to be managed (for example, an enterprise or an organization manages developed images), decoupling between an image research and development team, an image management team, and an image signer may be implemented. This improves user experience.

In another possible implementation, the indication information of the target image includes an identity of the target image and/or identification information of a container group used to run the target image.

In the foregoing description, the image management apparatus 120 may authenticate an identity of a signer. In this way, an untrusted signer can be kept from signing a signature file. This improves security of an image.

In another possible implementation, the information about the signer includes identity information of the signer, and the processor 1202 is further configured to: determine, based on the identity information, that identity authentication of the at least one signer succeeds.

In another possible implementation, the processor 1202 is further configured to: receive, through the communications interface 1204, authentication information of the signer sent by the second terminal device; and determine, based on the authentication information of the signer and the identity information, that identity verification of the signer succeeds.

The foregoing provides a method for authenticating an identity of a signer. An administrator, an automated management program, or the like may set the authentication information of the signer with the second terminal device. When the first terminal device uploads the identity information of the signer, the image management apparatus 120 may compare the identity information with the authentication information. If the identity information is consistent with the authentication information, it indicates that an identity of the signer is trusted.

In another possible implementation, the apparatus supports information transmission between the second terminal device, the first terminal device, and the container platform through an API.

The foregoing describes a communication manner. The image management apparatus 120 may be connected to the second terminal device, the first terminal device, and the container platform by an API interface. The foregoing device can implement functions such as image management, image signature, and image startup control by invoking a related function only through the API interface. This reduces difficulty of user operations.

In another possible implementation, the processor 1202 is further configured to generate a key pair corresponding to the signer, where the key pair includes a public key and a private key.

In the foregoing description, the image management apparatus 120 may generate a key pair in an image management process, and the key pair may be used in a signature, identity authentication, and a startup control process. Further, the key pair may be stored in the image management apparatus 110, and the user does not need to locally store a public key and a private key, so that key leakage can be avoided.

In another possible implementation, the information about the target image includes a hash value of the target image; the information about the signer corresponds to the private key of the signer; and the processor 1202 is further configured to generate the signature file based on the private key of the signer and the hash value of the target image.

The foregoing describes a manner in which the image management apparatus 120 generates a signature file. Information about an image includes a hash value of an image, and a signature file may be generated based on the private key of the signer and the hash value of the image. Because a mapping relationship exists between content of an image and a hash value of the image, if the content of the image is tampered with, a digest of the image also changes accordingly, so that whether the content of the image is tampered with can be identified based on the hash value of the image.

In another possible implementation, the processor 1202 is further configured to receive, through the communications interface 1204, a request message sent by the container platform, where the request information requests to use the target image to start the container on the container platform. Further, the request message includes the first digest.

Specifically, the container platform may add the indication information of the target image to the request message, and invoke startup control of the image through the API interface. In this way, when the container platform starts the container, the digest information of the target image is provided to the image management apparatus 120, and whether the image is secure may be determined based on fed-back indication information. An image check function of the container platform does not need to be adjusted, so that container platforms provided by a plurality of service providers can be quickly compatible.

In another possible implementation, the processor 1202 is further configured to add the authentication information of the signer to a signer database based on the authentication information of the signer.

In another possible implementation, the signer includes a first signer and a second signer; and the first terminal device includes a first subdevice and a second subdevice, where the first subdevice is a device used by the first signer, and the second subdevice is a device used by the second signer.

According to embodiments, a plurality of signers may separately upload, with one or more devices, information used for signature, to separately obtain signature files, so that a multi-person signature mechanism is implemented.

An embodiment further provides a server. The server includes a processor and a memory. The processor is configured to execute computer instructions stored in the memory, so that the server implements the image management method described in any embodiment shown in FIG. 4, FIG. 8, FIG. 9, or FIG. 10.

An embodiment further provides a computer-readable storage medium. The computer-readable storage medium stores computer instructions. When the computer instructions run on one or more processors, the image management method described in any embodiment shown in FIG. 4, FIG. 8, FIG. 9, or FIG. 10 is implemented.

An embodiment further provides a chip system. The chip system includes at least one processor, a memory, and an interface circuit. The interface circuit is configured to provide an information input/output to the at least one processor. The at least one memory stores computer instructions. When the computer instructions run on one or more processors, the image management method described in any embodiment shown in FIG. 4, FIG. 8, FIG. 9, or FIG. 10 is implemented.

An embodiment further provides a computer program product. When the computer program product runs on one or more processors, the image management method described in any embodiment shown in FIG. 4, FIG. 8, FIG. 9, or FIG. 10 is implemented.

All or some of the foregoing embodiments may be implemented by software, hardware, firmware, or any combination thereof. When software is used to implement embodiments, all or some of embodiments may be implemented in a form of a computer instruction product. The computer instruction product includes one or more computer instructions. When the computer instruction is loaded and executed on a computer, the procedures or functions according to embodiments are all or partially implemented. The computer may be a general-purpose computer, a dedicated computer, a computer network, or other programmable apparatuses. The computer instruction may be stored in a computer-readable storage medium, or may be transmitted via a computer-readable storage medium. The computer-readable storage medium may be any usable medium accessible by the computer, or a data storage device, such as a server or a data center that integrates one or more usable media. The usable medium may be a magnetic medium (for example, a floppy disk, a hard disk, or a magnetic tape), an optical medium (for example, a digital versatile disc (DVD), a semiconductor medium (for example, a solid-state disk (SSD)), or the like.

Sequence adjustment, combination, or deletion may be performed on the steps in the method embodiments based on an actual requirement.

The modules in the apparatus embodiments may be combined, divided, and deleted according to an actual requirement.

What is claimed is:

1. A method comprising:
   receiving, from a first terminal device, first information about a signer and second information about a target image, wherein the signer is designated to sign the target image;
   obtaining a signature file based on the first information and the second information; and
   instructing, when a first digest that is of the target image and is from a container platform matches a second digest that is based on the signature file, the container platform to allow use of the target image to start a container.

2. The method of claim 1, wherein before receiving the first information and the second information, the method further comprises receiving indication information of the target image and description information of the signer from a second terminal device, wherein the description information indicates the signer.

3. The method of claim 1, wherein the first information comprises identity information of the signer, and wherein the method further comprises determining, based on the identity information, that identity authentication of the signer succeeds.

4. The method of claim 3, further comprising:
   receiving authentication information of the signer from a second terminal device; and
   further determining, based on the authentication information, that the identity authentication of the signer succeeds.

5. The method of claim 4, further comprising supporting information transmission among the second terminal device, the first terminal device, and the container platform through an application programming interface (API).

6. The method of claim 2, wherein after receiving the description information, the method further comprises generating a key pair corresponding to the signer and comprising a public key and a private key.

7. The method of claim 6, wherein the second information comprises a hash value of the target image, wherein the first information corresponds to the private key, and wherein obtaining the signature file comprises generating the signature file based on the private key and the hash value.

8. The method of claim 6, further comprising receiving, from the container platform, a request message requesting to use the target image to start the container on the container platform.

9. The method of claim 6, further comprising adding authentication information of the signer to a signer database.

10. An apparatus comprising:
    a memory configured to store instructions; and
    one or more processors coupled to the memory and configured to execute the instructions to cause the apparatus to:
      receive, from a first terminal device, first information about a signer and second information about a target image, wherein the signer is designated to sign the target image;
      obtain a signature file based on the first information and the second information; and
      instruct, when a first digest that is of the target image and is from a container platform matches a second digest that is based on the signature file, the container platform to allow use of the target image to start a container.

11. The apparatus of claim 10, wherein before receiving the first information and the second information, the one or more processors are further configured to execute the instructions to cause the apparatus to receive indication information of the target image and description information of the signer from a second terminal device, wherein the description information indicates the signer.

12. The apparatus of claim 10, wherein the first information comprises identity information of the signer, and wherein the one or more processors are further configured to execute the instructions to cause the apparatus to determine, based on the identity information, that identity authentication of the signer succeeds.

13. The apparatus of claim 12, wherein the one or more processors are further configured to execute the instructions to cause the apparatus to:
    receive authentication information of the signer from a second terminal device; and
    further determine, based on the authentication information, that the identity authentication of the signer succeeds.

14. The apparatus of claim 13, wherein the one or more processors are further configured to execute the instructions to cause the apparatus to support information transmission among the second terminal device, the first terminal device, and the container platform through an application programming interface (API).

15. The apparatus of claim 11, wherein after receiving the description information, the one or more processors are further configured to execute the instructions to cause the apparatus to generate a key pair corresponding to the signer and comprising a public key and a private key.

16. The apparatus of claim 15, wherein the second information comprises a hash value of the target image, wherein the first information corresponds to the private key, and wherein the one or more processors are further configured to execute the instructions to cause the apparatus to obtain the signature file by generating the signature file based on the private key and the hash value.

17. The apparatus of claim 15, wherein the one or more processors are further configured to execute the instructions to cause the apparatus to receive, from the container platform, a request message requesting to use the target image to start the container on the container platform.

18. The apparatus of claim 15, wherein the one or more processors are further configured to add authentication information of the signer to a signer database.

19. A computer program product comprising instructions that are stored on a non-transitory computer-readable medium and that, when executed by one or more processors, cause an apparatus to:
- receive, from a first terminal device, first information about a signer and second information about a target image, wherein the signer is designated to sign the target image;
- obtain a signature file based on the first information and the second information; and
- instruct, when a first digest that is of the target image and is from a container platform matches a second digest that is based on the signature file, the container platform to allow use of the target image to start a container.

20. The computer program product of claim 19, wherein before receiving the first information and the second information, the instructions, when executed by the one or more processors, further cause the apparatus to receive indication information of the target image and description information of the signer from a second terminal device, wherein the description information indicates the signer.

* * * * *